(12) United States Patent
Hwang et al.

(10) Patent No.: US 10,185,530 B2
(45) Date of Patent: Jan. 22, 2019

(54) CONTENTS SHARING METHOD AND ELECTRONIC DEVICE SUPPORTING THE SAME

(71) Applicant: Samsung Electronics Co., Ltd., Suwon-si, Gyeonggi-do (KR)

(72) Inventors: Tae Hee Hwang, Seongnam-si (KR); Kyung Hwa Seo, Uijeongbu-si (KR); In Hye Youn, Seoul (KR); Jae Han Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/269,099

(22) Filed: Sep. 19, 2016

(65) Prior Publication Data

US 2017/0086014 A1    Mar. 23, 2017

(30) Foreign Application Priority Data

Sep. 23, 2015 (KR) .................. 10-2015-0134256

(51) Int. Cl.
| | |
|---|---|
| *G06F 3/14* | (2006.01) |
| *H04W 4/80* | (2018.01) |
| *H04L 29/08* | (2006.01) |
| *H04W 76/14* | (2018.01) |
| *G06F 3/0484* | (2013.01) |
| *G06F 3/0488* | (2013.01) |

(52) U.S. Cl.
CPC ............ *G06F 3/14* (2013.01); *H04L 67/06* (2013.01); *H04L 67/26* (2013.01); *H04W 4/80* (2018.02); *G06F 3/04842* (2013.01); *G06F 3/04845* (2013.01); *G06F 3/04886* (2013.01); *H04W 76/14* (2018.02)

(58) Field of Classification Search
None
See application file for complete search history.

(56) References Cited

U.S. PATENT DOCUMENTS

| | | | |
|---|---|---|---|
| 8,346,847 | B2 | 1/2013 | Steakley |
| 8,732,238 | B2 | 5/2014 | Steakley |
| 8,880,051 | B2 | 11/2014 | Ghosh et al. |
| 9,219,987 | B2 | 12/2015 | Ghosh et al. |
| 2007/0143446 | A1 | 6/2007 | Morris |

(Continued)

FOREIGN PATENT DOCUMENTS

| | | | |
|---|---|---|---|
| EP | 3051400 A1 * | 8/2016 | |
| EP | 3051400 A1 * | 8/2016 | ........... G06F 3/0488 |

(Continued)

*Primary Examiner* — Mohammed Rachedine
(74) *Attorney, Agent, or Firm* — Jefferson IP Law, LLP

(57) ABSTRACT

An electronic device for contents sharing is provided. The electronic device includes a memory configured to store at least one instruction, a sharable content and/or an application related to the sharable content, a processor configured to process at least one instruction stored in the memory and a display operatively connected to the processor. The processor is further configured to control for outputting, to the display, a sharing object set to transmit selected content to at least one of a plurality of external electronic devices individually or integrally, when an event corresponding to execution of the application or selection of the sharable content occurs.

14 Claims, 14 Drawing Sheets

(56) References Cited

U.S. PATENT DOCUMENTS

| | | | |
|---|---|---|---|
| 2010/0312817 A1* | 12/2010 | Steakley | G06F 8/61 709/202 |
| 2012/0180136 A1* | 7/2012 | Song | G06F 17/30557 726/26 |
| 2013/0124619 A1 | 5/2013 | Steakley | |
| 2014/0141714 A1 | 5/2014 | Ghosh et al. | |
| 2015/0061970 A1 | 3/2015 | Kim et al. | |
| 2015/0120817 A1 | 4/2015 | Jeong et al. | |
| 2015/0172866 A1 | 6/2015 | Ghosh et al. | |
| 2016/0192173 A1 | 6/2016 | Ghosh et al. | |
| 2016/0210016 A1 | 7/2016 | Shin et al. | |

FOREIGN PATENT DOCUMENTS

| | | | | |
|---|---|---|---|---|
| WO | 2015-046837 A | 4/2015 | | |
| WO | WO 2016034950 A1 * | 3/2016 | | H04L 51/24 |

* cited by examiner

CONTENTS SHARING METHOD AND ELECTRONIC DEVICE SUPPORTING THE SAME

CROSS-REFERENCE TO RELATED APPLICATION(S)

This application claims the benefit under 35 U.S.C. § 119(a) of a Korean patent application filed on Sep. 23, 2015 in the Korean Intellectual Property Office and assigned Serial number 10-2015-0134256, the entire disclosure of which is hereby incorporated by reference.

TECHNICAL FIELD

The present disclosure relates to content sharing.

BACKGROUND

An electronic device stores content collected for itself or received from an external electronic device. The stored content may be transmitted to an external electronic device.

According to the related art, a content sharing function requires a complicated procedure in which information related to an external electronic device (e.g., device identification information of an external electronic device) is entered, content to be transmitted to the external electronic device is selected, and then transmission confirmation is performed. Furthermore, a setting for establishing a communication channel and a transmission procedure should be repeatedly performed for each external electronic device in order to transmit content to a plurality of external electronic devices.

The above information is presented as background information only to assist with an understanding of the present disclosure. No determination has been made, and no assertion is made, as to whether any of the above might be applicable as prior art with regard to the present disclosure

SUMMARY

Aspects of the present disclosure are to address at least the above-mentioned problems and/or disadvantages and to provide at least the advantages described below. Accordingly, an aspect of the present disclosure is to provide a content sharing method for performing content sharing more easily and quickly through a simple user interface and an electronic device supporting the same.

In accordance with an aspect of the present disclosure, an electronic device is provided. The electronic device includes a memory configured to store at least one instruction, sharable content and/or an application related to the sharable content, a processor configured to control for processing the at least one instruction stored in the memory, and a display operatively connected to the processor, wherein the processor is further configured to control for outputting, to the display, a sharing object set to transmit selected content to at least one of a plurality of external electronic devices individually or integrally when an event corresponding to execution of the application or selection of the sharable content occurs.

In accordance with another aspect of the present disclosure, a method for content sharing is provided. The content sharing method includes receiving an event corresponding to an execution of a specified application related to sharable content or selection of the sharable content and outputting, to an execution screen of the specified application, a sharing object set to transmit the selected content to all or at least one of a plurality of external electronic devices.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
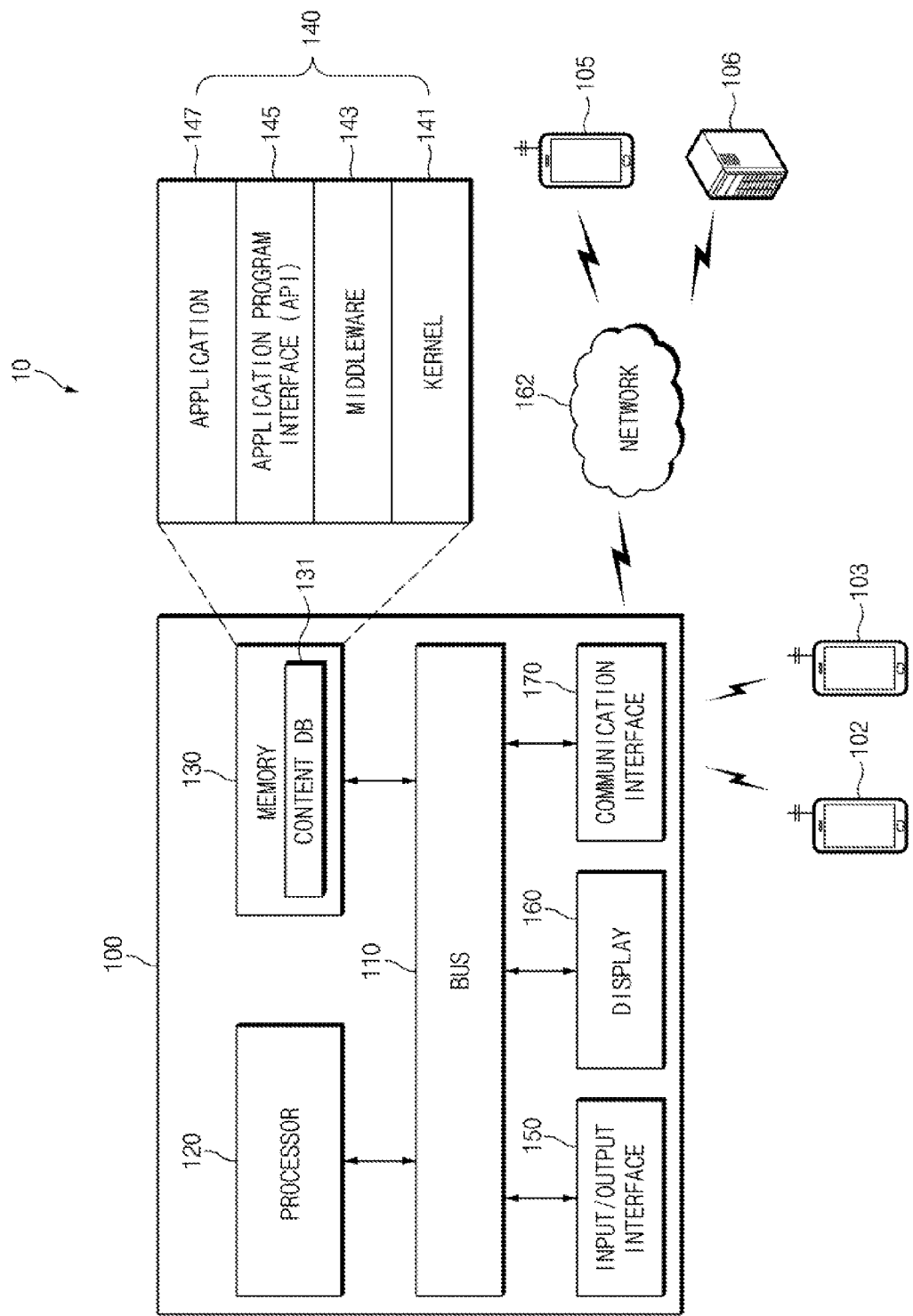
FIG. 1 is a diagram illustrating an example of an operation environment of an electronic device which supports a content sharing function according to various embodiments of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In the disclosure disclosed herein, the expressions "have", "may have", "include" and "comprise", or "may include" and "may comprise" used herein indicate existence of corresponding features (e.g., elements such as numeric values, functions, operations, or components) but do not exclude presence of additional features.

In the disclosure disclosed herein, the expressions "A or B", "at least one of A or/and B", or "one or more of A or/and B", and the like used herein may include any and all combinations of one or more of the associated listed items. For example, the term "A or B", "at least one of A and B", or "at least one of A or B" may refer to all of the case (1) where at least one A is included, the case (2) where at least one B is included, or the case (3) where both of at least one A and at least one B are included.

The terms, such as "first", "second", and the like used herein may refer to various elements of various embodiments, but do not limit the elements. Furthermore, such terms may be used to distinguish one element from another element. For example, "a first user device" and "a second user device" may indicate different user devices regardless of the order or priority thereof. For example, "a first user device" and "a second user device" indicate different user devices.

It will be understood that when an element (e.g., a first element) is referred to as being "(operatively or communicatively) coupled with/to" or "connected to" another element (e.g., a second element), it may be directly coupled with/to or connected to the other element or an intervening element (e.g., a third element) may be present. In contrast, when an element (e.g., a first element) is referred to as being "directly coupled with/to" or "directly connected to" another element (e.g., a second element), it should be understood that there are no intervening element (e.g., a third element).

According to the situation, the expression "configured to" used herein may be used as, for example, the expression "suitable for", "having the capacity to", "designed to", "adapted to", "made to", or "capable of". The term "configured to" must not mean only "specifically designed to" in hardware. Instead, the expression "a device configured to" may mean that the device is "capable of" operating together with another device or other components. Central processing unit (CPU), for example, a "processor configured to perform A, B, and C" may mean a dedicated processor (e.g., an embedded processor) for performing a corresponding operation or a generic-purpose processor (e.g., a CPU) or an application processor) which may perform corresponding operations by executing one or more software programs which are stored in a memory device.

Terms used in the present disclosure are used to describe specified embodiments and are not intended to limit the scope of the present disclosure. The terms of a singular form may include plural forms unless otherwise specified. Unless otherwise defined herein, all the terms used herein, which include technical or scientific terms, may have the same meaning that is generally understood by a person skilled in the art. It will be further understood that terms, which are defined in a dictionary and commonly used, should also be interpreted as is customary in the relevant related art and not in an idealized or overly formal detect unless expressly so defined herein in various embodiments of the present disclosure. In some cases, even if terms are terms which are defined in the specification, they may not be interpreted to exclude embodiments of the present disclosure.

An electronic device according to various embodiments of the present disclosure may include at least one of smartphones, tablet personal computers (PCs), mobile phones, video telephones, e-book readers, desktop PCs, laptop PCs, netbook computers, workstations, servers, personal digital assistants (PDAs), portable multimedia players (PMPs), Motion Picture Experts Group (MPEG-1 or MPEG-2) Audio Layer 3 (MP3) players, mobile medical devices, cameras, wearable devices (e.g., head-mounted-devices (HMDs), such as electronic glasses), an electronic apparel, electronic bracelets, electronic necklaces, electronic appcessories, electronic tattoos, smart watches, and the like.

According to another embodiment of the present disclosure, the electronic devices may be home appliances. The home appliances may include at least one of, for example, televisions (TVs), digital versatile disc (DVD) players, audios, refrigerators, air conditioners, cleaners, ovens, microwave ovens, washing machines, air cleaners, set-top boxes, home automation control panels, security control panels, TV boxes (e.g., Samsung HomeSync™, Apple TV™, or Google TV™), game consoles (e.g., Xbox™ or PlayStation™), electronic dictionaries, electronic keys, camcorders, electronic picture frames, or the like.

According to another embodiment of the present disclosure, the photographing apparatus may include at least one of medical devices (e.g., various portable medical measurement devices (e.g., a blood glucose monitoring device, a heartbeat measuring device, a blood pressure measuring device, a body temperature measuring device, and the like)), a magnetic resonance angiography (MRA), a magnetic resonance imaging (MRI), a computed tomography (CT), scanners, and ultrasonic devices), navigation devices, global positioning system (GPS) receivers, event data recorders (EDRs), flight data recorders (FDRs), vehicle infotainment devices, electronic equipment for vessels (e.g., navigation systems and gyrocompasses), avionics, security devices, head units for vehicles, industrial or home robots, automatic teller's machines (ATMs), points of sales (POSs), or internet of things (e.g., light bulbs, various sensors, electric or gas meters, sprinkler devices, fire alarms, thermostats, street lamps, toasters, exercise equipment, hot water tanks, heaters, boilers, and the like).

According to another embodiment of the present disclosure, the electronic devices may include at least one of parts of furniture or buildings/structures, electronic boards, electronic signature receiving devices, projectors, or various measuring instruments (e.g., water meters, electricity meters, gas meters, or wave meters, and the like). In the various embodiments, the electronic device may be one of the above-described various devices or a combination thereof. An electronic device according to an embodiment may be a flexible device. Furthermore, an electronic device according to an embodiment may not be limited to the above-described electronic devices and may include other electronic devices and new electronic devices according to the development of technologies.

Hereinafter, an electronic device according to the various embodiments of the present disclosure may be described with reference to the accompanying drawings. The term "user" used herein may refer to a person who uses an electronic device or may refer to a device (e.g., an artificial intelligence electronic device) that uses an electronic device.

FIG. 1 is a diagram illustrating an example of an operation environment of an electronic device which supports a content sharing function according to various embodiments of the present disclosure.

Referring to FIG. 1, an electronic device operating environment 10 may include an electronic device 100, a first external electronic device 102, a second external electronic device 103, a third external electronic device 105, a server 106, and a network 162.

The network 162 may support establishment of a communication channel between the electronic device 100 and the third external electronic device 105 or between the electronic device 100 and the server 106. The network 162 supports transmission of content stored in the electronic device 100 to the third external electronic device 105 or the server 106.

The first external electronic device 102 and the second external electronic device 103 may establish a short-range communication channel to the electronic device 100, as illustrated in FIG. 1 by z-shaped jagged lines. At least one of the first external electronic device 102 or the second external electronic device 103, for example, may be a companion device (e.g., a device which establishes and maintains a communication channel to the electronic device 100 continuously or according to a setting) of the electronic device 100. According to various embodiments of the present disclosure, at least one of the first external electronic device 102 or the second external electronic device 103 may be a wearable device of a user of the electronic device 100. According to various embodiments of the present disclosure, at least one of the first external electronic device 102, the second external electronic device 103, or the third external electronic device 105 may be a device which is substantially the same as or similar to the electronic device 100. Accordingly, the first external electronic device 102, the second external electronic device 103, and the third external electronic device 105 are classified according to characteristics of communication channels established between the forgoing external electronic devices and the electronic device 100, and, according to a setting or manipulation, the first external electronic device 102 or the second external electronic device 103 may establish a communication channel to the electronic device 100 based on the network 162. The third external electronic device 105 may establish a communication channel to the electronic device 100 based on a short-range communication channel and may share content therewith.

Referring to FIG. 1, at least one of the first external electronic device 102, the second external electronic device 103, or the third external electronic device 105 may receive content from the electronic device 100. At least one of the first external electronic device 102, the second external electronic device 103, or the third external electronic device 105 may store the received content. In this operation, at least one of the first external electronic device 102, the second external electronic device 103, or the third external electronic device 105 may provide, to the electronic device 100, a feedback (e.g., a content reception ratio) on the received content.

Referring to FIG. 1, the server 106 may establish a communication channel to the electronic device 100 via the network 162. The server 106 may receive and store content from the electronic device 100. The server 106 may provide a feedback on the received content to the electronic device 100. An external device (e.g., at least one of the server 106, the first external electronic device 102, the second external electronic device 103, or the third external electronic device 105) may be changed in terms of a state of a communication connection to the electronic device 100. For example, the external device may establish a new communication channel or may release a previously established communication channel according to a user's manipulation or a setting or manipulation of the electronic device 100.

Referring to FIG. 1, the electronic device 100 may transmit at least one of pieces of content stored in a memory 130 to an external device (e.g., at least one of the server 106, the first external electronic device 102, the second external electronic device 103, or the third external electronic device 105) according to a user's manipulation or a program setting. In this operation, the electronic device 100 may output a sharing object. The sharing object may be a user interface related to transmission of content. The sharing object may include, for example, an object corresponding to all external devices to which content is transmittable or an object corresponding to each external electronic device or the server 106. The electronic device 100 may transmit content to the external device if a specified condition (e.g., a condition that at least a part of selected specific content should be overlapped by (or overlaid with) the sharing object, or a condition that a specified event should occur after the overlap) is satisfied.

The electronic device 100 may include a bus 110, a processor 120, the memory 130, an input/output interface 150, the display 160, and a communication interface 170. In some various embodiments of the present disclosure, at least one of the foregoing elements may be omitted or another element may be added to the electronic device 100. The electronic device 100 may include a housing which surrounds or accommodates at least a portion of the foregoing elements.

Referring to FIG. 1, the bus 110 may include a circuit for connecting the above-mentioned elements 110 to 170 to each other and transferring communications (e.g., control messages and/or data) among the above-mentioned elements.

Referring to FIG. 1, the processor 120 may include one or more of a central processing unit (CPU), an application processor (AP), or a communication processor (CP). For example, the processor 120 may perform calculation or data processing about control and/or communication of at least another of the components of the electronic device 100.

According to various embodiments of the present disclosure, the processor 120 may support handling of a content sharing function of the electronic device 100. For example, the processor 120 may output a sharing object related to the content sharing function in response to execution of a specified application. According to an embodiment of the present disclosure, the processor 120 may automatically output the sharing object to an execution screen of the specified application such that the sharing object is overlaid on the execution screen. The processor 120 may move the sharing object or may adjust a size thereof in response to occurrence of an input event (e.g., an even of selecting and dragging the sharing object).

According to various embodiments of the present disclosure, if output of the sharing object is requested (e.g., execution of a specified application or occurrence of an event related to calling the sharing object while the specified application is run), the processor 120 (shown in FIG. 1) may collect information of external electronic devices currently connected. Alternatively, the processor 120 may collect information of at least one external electronic device with which content is allowed to be shared. Alternatively, the processor 120 may collect information of at least one external electronic device based on a history of having performed content sharing. The processor 120 may generate the sharing object based on collected information of an external electronic device (e.g., the external electronic devices 102, 103, and 105 and the server 106) and may output the sharing object.

According to various embodiments of the present disclosure, the processor 120 may output a specified sharing object (e.g., a sharing object generated in advance based on specified pieces of external electronic device information). The processor 120 may adjust the sharing object (e.g., addition, deletion, or inactivation of a sub object of the sharing object) in response to an additional input (e.g., addition of an external electronic device or deletion of an external electronic device registered as a sharing object) and may output the adjusted sharing object.

The processor 120 may handle content sharing in response to an event of requesting sharing of specific content (e.g., an event of selecting and dragging content such that the content is overlaid with at least a part of the sharing object). According to an embodiment of the present disclosure, the processor 120 may adjust the types or number of external electronic devices with which content is shared, according to characteristics of sub objects of sharing objects overlaid with content.

Referring to FIG. 1, the memory 130 may include a content database or content DB 131 to support the content sharing function. The content DB 131 may include, for example, at least one text document, at least one image, at least one audio file, phonebook information, an email, a message (a text or instant message), etc. Furthermore, the content DB 131 may include a web page or the like. In addition, the memory 130 may store a sharing application related to the content sharing function.

Referring to FIG. 1, the memory 130 may include a volatile memory and/or a nonvolatile memory. The memory 130 may store instructions or data related to at least one of the other elements of the electronic device 100. According to an embodiment of the present disclosure, the memory 130 may store software and/or a program 140. The program 140 may include, for example, a kernel 141, a middleware 143, an application programming interface (API) 145, and/or an application program (or an application) 147. At least a portion of the kernel 141, the middleware 143, or the API 145 may be referred to as an operating system (OS).

Referring to FIG. 1, the kernel 141 may control or manage, for example, system resources (e.g., the bus 110, the processor 120, or the memory 130, and the like) used to execute an operation or function implemented in the other programs (e.g., the middleware 143, the API 145, or the application program 147). Also, as the middleware 143, the API 145, or the application program 147 accesses a separate component of the electronic device 101, the kernel 141 may provide an interface which may control or manage system resources.

Referring to FIG. 1, the middleware 143 may play a role as, for example, a go-between such that the API 145 or the application program 147 communicates with the kernel 141 to communicate data.

Also, the middleware 143 may process one or more work requests, received from the application program 147, in order of priority. For example, the middleware 143 may assign priority which may use system resources (the bus 110, the processor 120, or the memory 130, and the like) of the electronic device 101 to at least one of the at least one application program 147. For example, the middleware 143 may perform scheduling or load balancing for the one or more work requests by processing the one or more work requests in order of the priority assigned to the at least one of the at least one application program 147.

Referring to FIG. 1, the API 145 may be, for example, an interface in which the application program 147 controls a function provided from the kernel 141 or the middleware 143. For example, the API 145 may include at least one interface or function (e.g., a command) for file control, window control, image processing, or text control, and the like.

Referring to FIG. 1, the application 147 may include a program coded to perform a specified function. For example, the application 147 may include a messenger application corresponding to a messenger program capable of processing task information. According to various embodiments of the present disclosure, the sharing application may be a program related to output of the sharing object. The sharing application, for example, may include an instruction set (e.g., a routine, class, function, template, or the like) related to displaying of the sharing object. Furthermore, the sharing application may include an instruction set for adjusting the sharing object according to whether a specified condition is satisfied, an instruction set for collecting connection information, an instruction set for transmitting content according to whether a specified condition is satisfied, etc.

Referring to FIG. 1, the input and output interface 150 may play a role as, for example, an interface which may transmit a command or data input from a user or another external device to another component (or other components) of the electronic device 101. Also, input and output interface 150 may output an instruction or data received from another component (or other components) of the electronic device 101 to the user or the other external device.

According to an embodiment of the present disclosure, the input/output interface 150 may generate an input signal related to scanning of at least one external electronic device, an input signal for selecting an external electronic device from among discovered external electronic devices in relation to content sharing, an input signal related to selecting of content, an input signal for indicating content sharing, etc. in response to a user input.

According to various embodiments of the present disclosure, the input/output interface 150 may include an audio input/output device such as a speaker, a receiver, an earphone, a microphone, or the like. According to an embodiment of the present disclosure, the input/output interface 150 may output audio information corresponding to output of the sharing object, audio information corresponding to execution or completion of content transmission based on the sharing object, etc. Outputting the above-mentioned audio information may be skipped according to a setting.

Referring to FIG. 1, the display 160 may include, for example, a liquid crystal display (LCD), a light emitting diode (LED) display, an organic LED (OLED) display, plastic OLED (POLED), a microelectromechanical systems (MEMS) display, or an electronic paper display. The display 160 may display, for example, a variety of content (e.g., text, images, videos, icons, or symbols, and the like) to the user. The display 160 may include a touch screen, and may receive, for example, touch, gesture, proximity, or a hovering input using an electronic pen or part of a body of the user.

According to various embodiments of the present disclosure, the display 160 may output at least one screen or user interface related to the content sharing function. According to an embodiment of the present disclosure, the display 160 may output an execution screen of a specified application overlaid with the sharing object. Alternatively, the display 160 may output a screen including at least one virtual button or item related to output of the sharing object. According to various embodiments of the present disclosure, the display 160 may output a screen related to setting of the sharing object.

Referring to FIG. 1, the communication interface 170, for example, may set communications between the electronic device 100 and an external device (e.g., the first external electronic device 102, the second external electronic device 103, the third external electronic device 105, or the server 106). The communication interface 170 may establish communication between, for example, the electronic device 101 and an external device (e.g., a first external electronic device 102, a second external electronic device 104, or a server 106). For example, the communication interface 170 may connect to a network 162 through wireless communication or wired communication and may communicate with the external device (e.g., the second external electronic device 104 or the server 106).

The wireless communication may use, for example, at least one of long term evolution (LTE), LTE-advanced (LTE-A), code division multiple access (CDMA), wideband CDMA (WCDMA), universal mobile telecommunications system (UMTS), wireless broadband (WiBro), or global system for mobile communications (GSM), and the like as a cellular communication protocol. Also, the wireless communication may include, for example, local-area communication 164. The local-area communication 164 may include, for example, at least one of wireless-fidelity (Wi-Fi) communication, Bluetooth (BT) communication, near field communication (NFC), or global navigation satellite system (GNSS) communication, and the like.

A magnetic secure transmission (MST) module may generate a pulse based on transmission data using an electromagnetic signal and may generate a magnetic field signal based on the pulse. The electronic device 101 may output the magnetic field signal to a point of sales (POS) system. The POS system may restore the data by detecting the magnetic field signal using an MST reader and converting the detected magnetic field signal into an electric signal.

The GNSS may include, for example, at least one of a global positioning system (GPS), a Glonass, a Beidou navigation satellite system (hereinafter referred to as "Beidou"), or a Galileo (i.e., the European global satellite-based navigation system) according to an available area or a bandwidth, and the like. Hereinafter, the "GPS" used herein may be interchangeably with the "GNSS". The wired communication may include at least one of, for example, universal serial bus (USB) communication, high definition multimedia interface (HDMI) communication, recommended standard 232 (RS-232) communication, or plain old telephone service (POTS) communication, and the like. The network 162 may include a telecommunications network, for example, at least one of a computer network (e.g., a local area network (LAN) or a wide area network (WAN)), the Internet, or a telephone network.

According to various embodiments of the present disclosure, the communication interface 170 (shown in FIG. 1) may transmit content to an external electronic device registered in the sharing object, in response to control by the processor 120. According to various embodiments of the present disclosure, the communication interface 170 may scan an external electronic device for which a short-range communication channel is to be established, in response to control by the processor 120. The communication interface 170 may transfer, to the processor 120, information (e.g., device identification information or the like) related to a scanned external electronic device.

According to an embodiment of the present disclosure, the server 106 (shown in FIG. 1) may include a group of one or more servers. According to various embodiments of the present disclosure, a portion or all of operations performed in the electronic device 100 may be performed in one or more other electronic devices (e.g., the external electronic device 102, 103, or 105 or the server 106). According to an embodiment of the present disclosure, in the case where the electronic device 100 should perform a certain function or service automatically or in response to a request, the electronic device 100 may request at least a portion of functions related to the function or service from another device (e.g., the external electronic device 102, 103, or 105 or the server 106) instead of or in addition to performing the function or service for itself. The other electronic device (e.g., the external electronic device 102, 103, or 105 or the server 106) may perform the requested function or additional function, and may transfer a result of the performance to the electronic device 100. The electronic device 100 may intactly use or additionally process a received result to provide the requested function or service. To this end, for example, a cloud computing technology, a distributed computing technology, or a client-server computing technology may be used.

Figure 2:
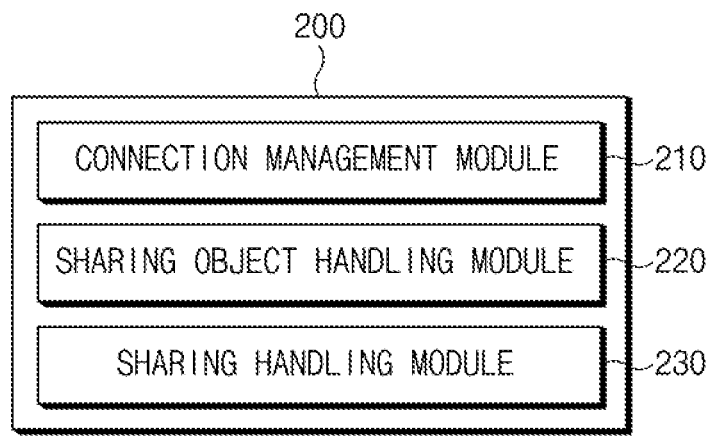
FIG. 2 is a diagram illustrating an example of a configuration of a processor related to a content sharing function according to various embodiments of the present disclosure.

FIG. 2 is a diagram illustrating an example of a configuration of a processor related to a content sharing function according to various embodiments of the present disclosure.

Referring to FIG. 2, a processor 200 (e.g., the processor 120) according to an embodiment of the present disclosure may include a connection management module 210, a sharing object handling module 220, a sharing handling module 230. At least a part of at least one of the connection management module 210, the sharing object handling module 220, or the sharing handling module 230 may be configured as hardware. Alternatively, at least one of the connection management module 210, the sharing object handling module 220, or the sharing handling module 230 may be provided as at least one of hardware, middleware, or software. According to various embodiments of the present disclosure, the connection management module 210, the sharing object handling module 220, and the sharing handling module 230 may be provided as respective hardware processors. Alternatively, the connection management module 210, the sharing object handling module 220, and the sharing handling module 230 may be provided as a software module, middleware, or the like, and may include at least one instruction loaded on a memory so as to be executed by the processor 200.

Referring to FIG. 2, the connection management module 210 may control the communication interface 170 (shown in FIG. 1) so that the communication interface 170 scans an external electronic device (e.g., the first external electronic device 102, the second external electronic device 103, etc.) according to a specified condition. The connection management module 210 may collect identification information of scanned external electronic devices, and may transfer the identification information to the sharing object handling module 220. According to an embodiment of the present disclosure, the connection management module 210 may check a connection of an external electronic device periodically or substantially in real time. Alternatively, the connection management module 210 may collect information related to a currently connected external electronic device if execution of a specified application (e.g., an application related to execution of sharable content) is requested. According to various embodiments of the present disclosure, the connection management module 210 may collect, store, and manage information related to an external electronic device having a history of having been connected. The connection management module 210 may transfer an external electronic device connection history to the sharing object handling module 220.

Referring to FIG. 2, the sharing object handling module 220 may output a sharing object set as a default sharing object. For example, the sharing object handling module 220 may output a sharing object including specified sub objects and common object if a sharing object output request (e.g., execution of a specified application or selection of a specified virtual button) is made. The sub objects, for example, may include or may be linked to connection information for transmitting selected content to a specific external electronic device.

According to various embodiments of the present disclosure, with reference to FIG. 2, the sharing object handling module 220 may output a sharing object related to currently connected external electronic devices. In relation to this operation, the sharing object handling module 220 may receive connection information related to connected external electronic devices from the connection management module 210 periodically or substantially in real time. The sharing object handling module 220 may adjust at least one of the types or shapes of the sub objects included in the sharing object based on the received connection information. For example, the sharing object handling module 220 may adjust the number of the sub objects corresponding to the number of external electronic devices included in the connection information. Furthermore, the sharing object handling module 220 may adjust the sizes of the sub objects according to the number of the connected external electronic devices.

According to various embodiments of the present disclosure, the sharing object handling module 220 (shown in FIG. 2) may change display forms (e.g., a smartphone shape, a notebook shape, a wearable device shape, or a color, size, or display position of each shape) of the sub objects according to the types of the connected external electronic devices. According to various embodiments of the present disclosure, the sharing object handling module 220 may add, to the sub objects, text information corresponding to the identification information of the connected external electronic devices.

According to various embodiments of the present disclosure, the sharing object handling module 220 may provide a sharing object setting screen. For example, the sharing object handling module 220 may output a list screen for selecting an external electronic device corresponding to a sub object of a sharing object. The sharing object handling module 220 may generate a sharing object including sub objects corresponding external electronic devices selected by a user from the sharing object setting screen or automatically selected as a specified condition is satisfied.

According to various embodiments of the present disclosure, with reference to FIG. 2, the sharing object handling module 220 may automatically add at least one specified external electronic device as a sub object. For example, the sharing object handling module 220 may provide a sub object corresponding to an external electronic device which has recently performed a phone call, an external electronic device which has recently established a short-range communication channel, or an external electronic device which has recently transmitted/received a message (a text message or an instant message). According to an embodiment of the present disclosure, the sharing object handling module 220 may provide a sub object corresponding to at least one external electronic device which has established a communication channel within a specified period of past time (e.g., one hour, one day, or one week). In the case where the number of external electronic devices to be provided as sub objects is equal to or larger than a specified number, the sharing object handling module 220 may provide sub objects corresponding to external electronic devices having a certain ranking or higher (e.g., third ranking or higher or fifth ranking or higher) in order from most recent to least recent among external electronic devices which has recently established a communication channel.

According to various embodiments of the present disclosure, the sharing object handling module 220 (shown in FIG. 2) may automatically add, to the sharing object, a sub object corresponding to at least one external electronic device which has established a communication channel at least a specified number of times (e.g., an external electronic device which has attempted to make a phone call or has made a phone call or has transmitted/received a message at least a certain number of times). According to various embodiments of the present disclosure, the sharing object handling module 220 may automatically add, to the sharing object, a sub object corresponding to an external electronic device having a specified characteristic (e.g., an external electronic device classified as a family in a phonebook or an external electronic device classified as a friend in the phonebook).

As described above, the sharing object handling module 220 (shown in FIG. 2) may select a sub object to be automatically added to the sharing object based on an electronic device operation history (e.g., a history of having communicated with an external electronic device). According to various embodiments of the present disclosure, the sharing object handling module 220 may output a list corresponding to the electronic device operation history, and may add, to the sharing object, a sub object corresponding to a user's selection. According to various embodiments of the present disclosure, in relation to a change of an output sub object, the sharing object handling module 220 may output the list corresponding to the electronic device operation history, and may change the sub object according to a user's selection.

According to various embodiments of the present disclosure, the sharing object handling module 220 (shown in FIG. 2) may output the sharing object to an execution screen of a specified application in response to occurrence of a specified event. In relation to this operation, the sharing object handling module 220 may provide at least one virtual item related to output or removal of the sharing object or may perform a specified physical button setting. Furthermore, the sharing object handling module 220 may provide a setting screen for selecting an application for which the sharing object is to be output or cancelling a selected application.

According to various embodiments of the present disclosure, the sharing object handling module 220 (shown in FIG. 2) may adjust at least one of a position, size, shape, color, or brightness of the sharing object in response to occurrence of an input event. For example, if an event for adjusting the size of the sharing object (e.g., a pinch event or the like) occurs, the sharing object handling module 220 may adjust the size of a displayed sharing object according to the type or size of the event. Furthermore, the sharing object handling module 220 may adjust the position of the sharing object on the display 160 in response to occurrence of an event related to movement of the sharing object (e.g., a drag event). According to various embodiments of the present disclosure, the sharing object handling module 220 may differently adjust the sizes of sub objects or may change the positions of the sub objects in response to an input event.

According to various embodiments of the present disclosure, the sharing object handling module 220 (shown in FIG. 2) may make the positions and sizes of sub objects different from each other according to characteristics of external electronic devices corresponding to the sub objects. For example, the sharing object handling module 220 may display a sub object having a history of having shared content more times than other sub objects so that the sub object has a larger size or brighter color or is positioned at a forefront of the sub objects. Furthermore, the sharing object handling module 220 may display a sub object corresponding to an external electronic device connected to the electronic device 100 (shown in FIG. 1) for a relatively long time so that the sub object is different from other sub objects (e.g., the sub object is larger or brighter than the other sub objects). In addition, the sharing object handling module 220 may display a sub object corresponding to an external electronic device which is relatively close to the electronic device 100 (e.g., determined based on an intensity of a signal of a communication channel) so that the sub object is different from other sub objects (e.g., the sub object is larger or brighter than the other sub objects).

The sharing handling module 230 (shown in FIG. 2) may handle transmission of content in response to a specified input event. For example, the sharing handling module 230 may display content so that the content is movable on the display 160 (shown in FIG. 1), in response to selection of the content. The sharing handling module 230 may check the type of a sharing object (e.g., the type of a sub object or a common object) overlapped by at least a part of an image corresponding to moved content. The sharing handling module 230 may transmit selected content to an overlapped sub object. If a content image at least partially overlaps a common object (or if a distance between the content image and the common object is smaller than a specified distance), the sharing handling module 230 may transmit content to external electronic devices corresponding to all of currently displayed sub objects. According to an embodiment of the present disclosure, if a specified event (e.g., a touch release event) occurs after the content image overlaps a sub object (or a common object), the sharing handling module 230 may handle transmission of content.

According to various embodiments of the present disclosure, the sharing handling module 230 (shown in FIG. 2) may receive a request related to content sharing from an external electronic device. The sharing handling module 230 may output a popup window or the like indicating whether content is received. The sharing handling module 230 may receive content according to a user input, and may store the content in the memory 130 (shown in FIG. 1). According to various embodiments of the present disclosure, if content is received from a specified electronic device (e.g., an electronic device of which a connection time is at least a certain time or of which the number of times of content sharing is at least a certain number of times or which is set by default for reception), the sharing handling module 230 may automatically handle reception of the content. If automatic content reception is completed, the sharing handling module 230 may output a guide message corresponding to the completion. In relation to transmission or reception of content, the sharing handling module 230 may display a progress bar or the like corresponding to a state of content reception or content transmission information (or reception information). Alternatively, the sharing handling module 230 may output the progress bar to at least a part of the sharing object.

According to the above-mentioned various embodiments of the present disclosure, an electronic device may include a memory configured to store a sharable content or an application related to the sharable content, a processor configured to process at least one instruction stored in the memory and a display operatively connected to the processor, wherein the processor is configured to control for outputting, to the display, a sharing object set to transmit selected content to at least one of a plurality of external electronic devices individually or integrally when an event corresponding to execution of the application or selection of the sharable content occurs.

According to the embodiments of the present disclosure, the processor may further be configured to control for outputting the sharing object comprising at least one sub object respectively corresponding to the plurality of external electronic devices and one common object set to transmit the content to all the plurality of external electronic devices in response to one user input event (e.g., one touch event to select the common object).

According to the embodiments of the present disclosure, the processor may further be configured to control for outputting the sharing object comprising at least one sub object related to identification information of a currently connected external electronic device.

According to the embodiments of the present disclosure, the processor may further be configured to control for changing and displaying the sharing object when information on connection to the external electronic devices is changed.

According to the embodiments of the present disclosure, the processor may further be configured to control for displaying the sharing object comprising a sub object corresponding to a newly additionally connected external electronic device.

According to the embodiments of the present disclosure, the processor may further be configured to control for displaying the sharing object from which a sub object corresponding to an external electronic device has been removed, in response to disconnection of the external electronic device.

According to the embodiments of the present disclosure, the processor may further be configured to control for displaying a sub object selected by a specified input event such that the sub object indicates a content-transmission-disabled state.

According to the embodiments of the present disclosure, the processor may further be configured to control for changing at least one of a position, a size, a shape, a color, or brightness of the sharing object according to at least one of a specified input event, types of connected external electronic devices, distances to the external electronic devices, or a history of content transmission to the external electronic devices.

According to the embodiments of the present disclosure, the processor may further be configured to control for outputting a virtual button related to output of the sharing object or a virtual button related to removal of the sharing object.

According to the embodiments of the present disclosure, the processor may further be configured to control for displaying, when the content is transmitted, information corresponding to a transmission state in association with the sharing object.

According to the above-mentioned various embodiments of the present disclosure, an electronic device according to an embodiment of the present disclosure may include a housing, a memory for storing at least one instruction, and a processor electrically connected to the memory, wherein the memory may store at least one instruction that, when executed, causes the processor to be configured to control for outputting a sharing object including sub objects corresponding to a plurality of currently connected external electronic devices and an integrated object provided to integrally transmit content to the plurality of external electronic devices.

According to the above-mentioned various embodiments of the present disclosure, an electronic device according to an embodiment of the present disclosure may include a housing, a memory for storing at least one instruction, and a processor electrically connected to the memory, wherein the memory may store at least one instruction that, when executed, causes the processor to be configured to control for outputting, to an execution screen of a specified application, a sharing object including sub objects corresponding to a plurality of currently connected external electronic devices and an integrated object provided to integrally transmit content to the plurality of external electronic devices, if a request for executing the application is received.

Figure 3:
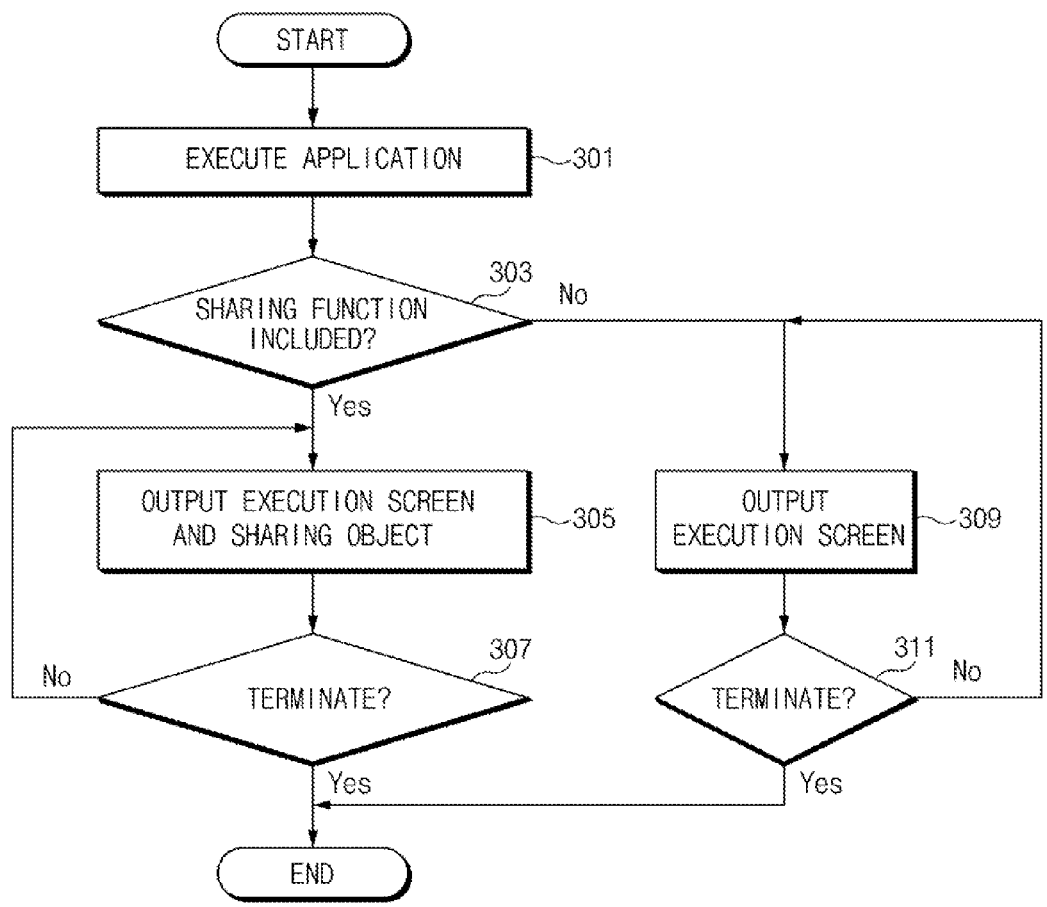
FIG. 3 is a diagram illustrating a content sharing method according to various embodiments of the present disclosure.

FIG. 3 is a diagram illustrating a content sharing method according to various embodiments of the present disclosure.

Referring to FIG. 3, in operation 301, the processor 200 (shown in FIG. 2) or the processor 120 of the electronic device 100 (shown in FIG. 1) may execute an application in response to occurrence of a specified event or a preset schedule.

If the application is executed, the processor 200 (e.g., the connection management module 210) may determine whether the application has a sharing function in operation 303. For example, the processor 200 may determine whether the executed application is related to at least one of an image, a text, or audio information which is transmittable to an external electronic device. Alternatively, the processor 200 may determine whether the executed application is related to execution of the sharing function.

If the executed application has the sharing function or a sharing object is set to be output for the application, the processor 200 (e.g., the sharing object handling module 220) may output an execution screen and the sharing object in operation 305. In operation 305, the processor 200 may determine the number and types of sub objects to be added to the sharing object according to a setting related to the sharing object, and may generate the sharing object to be output based on a result of the determination. The processor 200 (shown in FIG. 2) may output the sharing object so that the sharing object is overlaid on the execution screen of the application. According to various embodiments of the present disclosure, the processor 200 may adjust a size of a previous screen in order to output the sharing object, or may secure a screen space to which the sharing object is to be output and then may output the sharing object to the secured spaced.

With reference to FIGS. 2 and 3, the processor 200 (e.g., the sharing handling module 230) may determine whether an event related to termination of the sharing object occurs in operation 307. If the event related to the termination of the sharing object does not occur, the process may return to operation 305 so that the processor 200 may re-perform operation 305 and the following operations. According to various embodiments of the present disclosure, if an event related to termination of an application which is operating the sharing object or termination of operation of the electronic device occurs, the processor 200 may terminate the entire process illustrated in FIG. 3 and may enter a specified state (e.g., a sleep state).

Referring to FIGS. 2 and 3, if the executed application does not have the sharing function or the sharing object is not set to be output for the application in operation 303, the processor 200 may output an execution screen in operation 309. Thereafter, if an application termination event does not occur in operation 311, the process may return to operation 309 so that processor 200 may support execution and operation of the application, and if the event related to application termination does occur in operation 311, the processor 200 may terminate an application. According to various embodiments of the present disclosure, the processor 200 may output, to an application execution screen, a virtual button or the like related to output of the sharing object. The processor 200 may output the sharing object to the application execution screen if the virtual button is selected.

Figure 4:
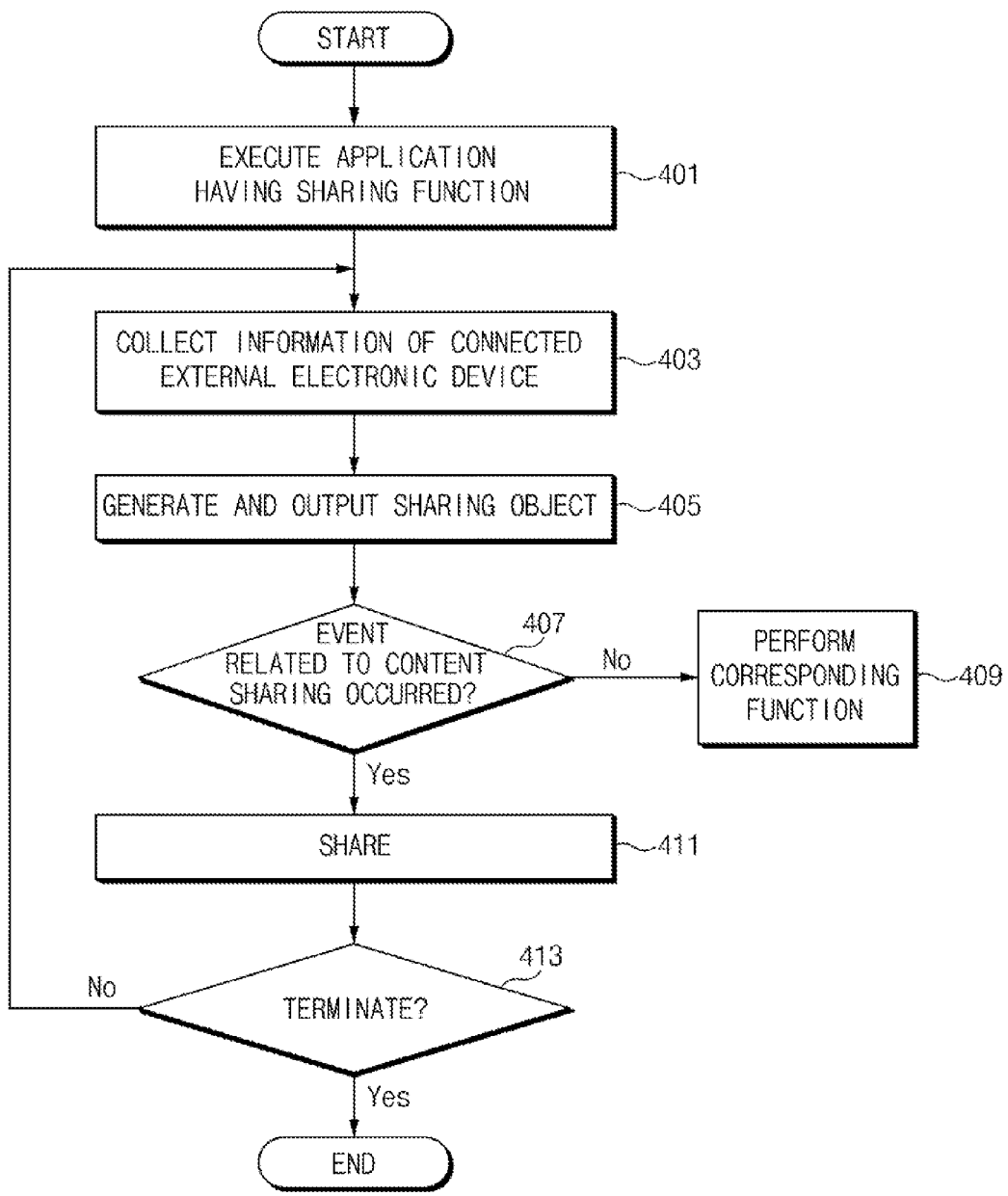
FIG. 4 is a diagram illustrating a connection-based content sharing method according to various embodiments of the present disclosure.

FIG. 4 is a diagram illustrating a connection-based content sharing method according to various embodiments of the present disclosure.

Referring to FIG. 4, in operation 401, the processor 200 (shown in FIG. 2) may handle execution of an application having a sharing function. For example, the processor 200 (e.g., the sharing object handling module 220) may provide an icon or a menu related to execution of an application for which a sharing object is set to be output. Alternatively, the processor 200 may provide an icon or a menu related to an application having the sharing function (e.g., an application related to at least one of an image, a text, or audio information which is transmittable to an external electronic device). If the icon or menu is selected, the processor 200 may execute the application having the sharing function.

Referring to FIG. 4, in operation 403 during execution of the application, the processor 200 (e.g., the connection management module 210) may collect information of one or more connected external electronic devices. In relation to this operation, the processor 200 may check a region of the memory 130 (shown in FIG. 1) in which information of external electronic devices already connected is stored. In operation 405, the processor 200 may generate and output the sharing object. In operation 405, the processor 200 may generate the sharing object including at least one sub object corresponding to connected external electronic devices. According to an embodiment of the present disclosure, the processor 200 may output sub objects, the number of which corresponds to the number of the connected external electronic devices. According to an embodiment of the present disclosure, the processor 200 may not output the sharing object if there is no connected external electronic device.

Alternatively, the processor 200 may output a guide message notifying that there is no connected external electronic device. According to various embodiments of the present disclosure, the processor 200 may output the sharing object including only one sub object if there is only one connected external electronic device. According to various embodiments of the present disclosure, the processor 200 may output the sharing object including a plurality of sub objects and a common object if a plurality of external electronic devices is connected.

Although it has been described that the sharing object is generated and output after an application is executed, various embodiments of the present disclosure are not limited thereto. For example, if execution of an application is requested, the processor 200 (shown in FIG. 2) may generate the sharing object while preparing an execution screen of the application according to whether the application has the sharing function (or the sharing object is set to be output for the application), so as to output the sharing object and the execution screen of the application substantially at the same time.

With reference to FIGS. 2 and 4, the processor 200 (e.g., the sharing object handling module 220) may determine whether an event related to content sharing occurs in operation 407. For example, the processor 200 may determine whether an event of selecting at least one piece of sharable content on the application execution screen and then dragging it to the sharing object occurs. If the event related to content sharing does not occur, the processor 200 may handle execution of a function according to the type of an occurring event in operation 409. For example, the processor 200 may display an execution screen of a content icon selected from the application execution screen or may display an image or a text corresponding to the content icon.

Referring to FIG. 4, if the event related to content sharing occurs, the processor 200 (e.g., the sharing handling module 230, shown in FIG. 2) may perform a sharing operation in operation 411. For example, the processor 200 may transmit selected content to an external electronic device corresponding to a specified sub object. Alternatively, when the common object is selected, the processor 200 may transmit the selected content to external electronic devices corresponding to all the sub objects. In other words, when one touch event to select the common object outputted on a screen occurs, the processor 200 may transmit the selected content to external electronic devices currently connected with the electronic device 100 in response to the one touch event.

The processor 200 (shown in FIG. 2) may determine whether an event related to termination of an application or termination of a function related to the sharing object occurs in operation 413. If the event related to termination does not occur, the process may return to operation 403 so that the processor 200 may re-perform operation 403 and the following operations. When the event related to termination occurs, the processor 200 may stop outputting the sharing object, or may terminate the sharing object and the application.

Figure 5:
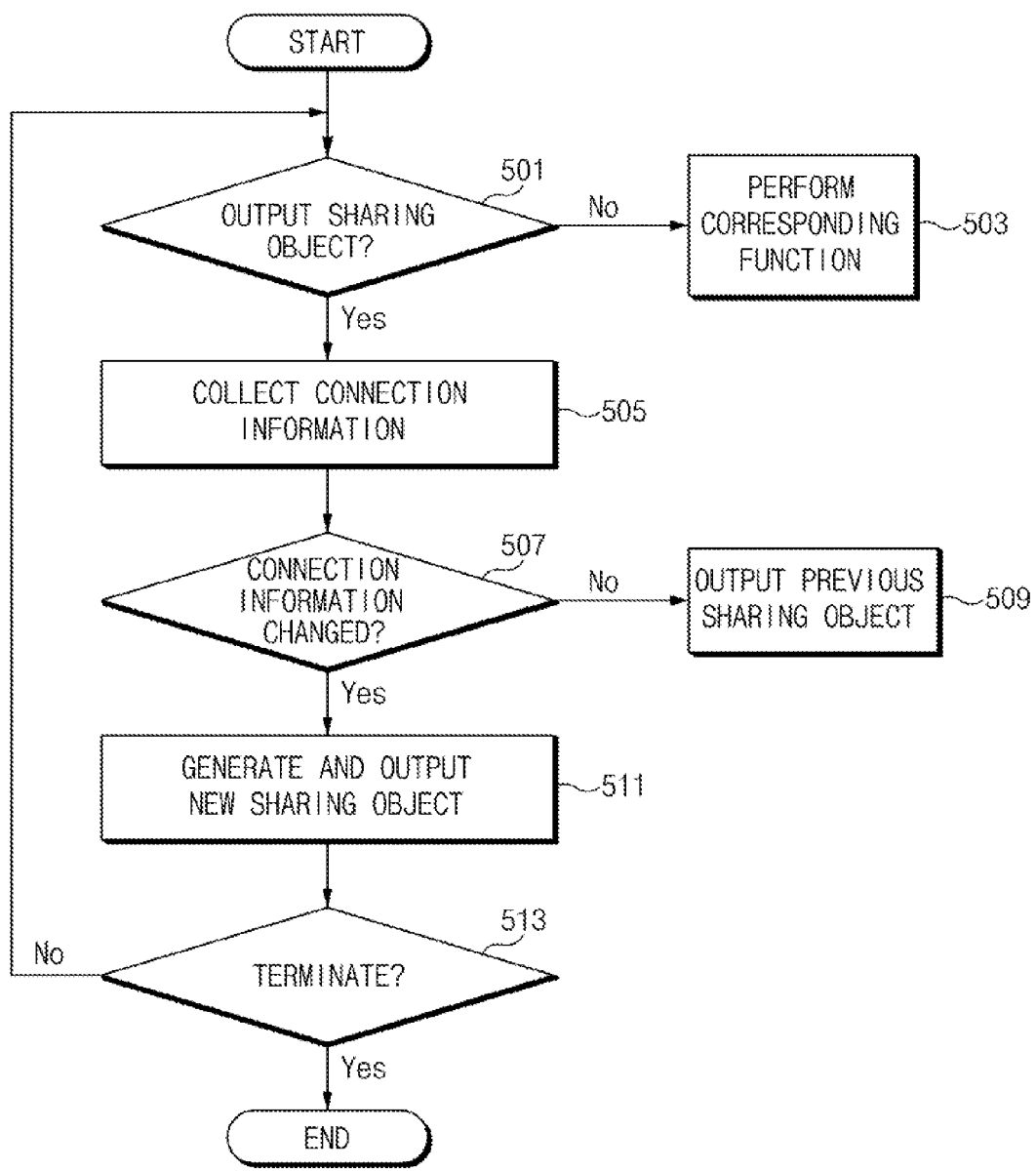
FIG. 5 is a diagram illustrating a content sharing method related to sharing object modification according to various embodiments of the present disclosure.

FIG. 5 is a diagram illustrating a content sharing method related to sharing object modification according to various embodiments of the present disclosure.

Referring to FIG. 5, in operation 501, if an event occurs, the processor 200 (e.g., the sharing object handling module 220, shown in FIG. 2) may determine whether the event is related to output of a sharing object. For example, the processor 200 may determine whether an icon or a menu related to output of the sharing object is selected. Alternatively, the processor 200 may determine whether an event of requesting execution of an application, for which the sharing object is set to be output, occurs.

Referring to FIG. 5, if the event is not related to output of the sharing object, the processor 200 (shown in FIG. 2) may perform a function corresponding to the type of the event in operation 503. For example, the processor 200 may execute a specific application, and may output an execution screen accordingly. Alternatively, the processor 200 may perform a file editing function or a message writing function according to the type of the event.

Referring to FIG. 5, if the event related to output of the sharing object occurs, the processor 200 (e.g., the connection management module 210, shown in FIG. 2) may collect connection information in operation 505. For example, the processor 200 may collect identification information of currently connected external electronic devices as the connection information. Alternatively, the processor 200 may collect, as the connection information, identification information of external electronic devices set to be applied to a sharing object. Alternatively, the processor 200 may collect identification information of currently connectable external electronic devices as the connection information by performing a scanning operation.

Referring to FIG. 5, in operation 507, the processor 200 (e.g., the connection management module 210, shown in FIG. 2) may determine whether an event related to a change of the connection information occurs, periodically or substantially in real time. For example, the processor 200 may determine whether a previously connected external electronic device is disconnected, or an external electronic device which has not been connected is newly connected. Alternatively, the processor 200 may determine whether new external electronic device identification information is registered as the connection information according to a change of a setting. For example, new external electronic device identification information may be selected according to a user input. If there is no change in the connection information, the processor 200 may output a previous sharing object or may maintain an output state of the previous sharing object in operation 509.

If the connection information is changed, the processor 200 (e.g., the sharing object handling module 220, shown in FIG. 2) may generate and output a new sharing object in operation 511. For example, the processor 200 may provide sub objects corresponding to changed connection information, and may generate and output a new sharing object including the sub objects. When generating the new sharing object, the processor 200 may generate sub objects based on at least one of types, connection states, or connection histories of external electronic devices corresponding to the sub objects. According to an embodiment of the present disclosure, in the case where an external electronic device is additionally connected, the processor 200 may add a new sub object to the sharing object. Alternatively, in the case where a connected external electronic device is disconnected, the processor 200 may remove a sub object corresponding to the external electronic device from the sharing object.

Referring to FIG. 5, the processor 200 (e.g., the sharing object handling module 220) may determine whether a termination event related to termination of a sharing object function or an application related to the sharing object occurs in operation 513. If the termination event does not occur, the process may return to operation 501 so that the processor 200 may re-perform operation 501 and the following operations. When the termination event occurs, the processor 200 may remove an output sharing object, or may terminate the application related to the sharing object.

Figure 6:
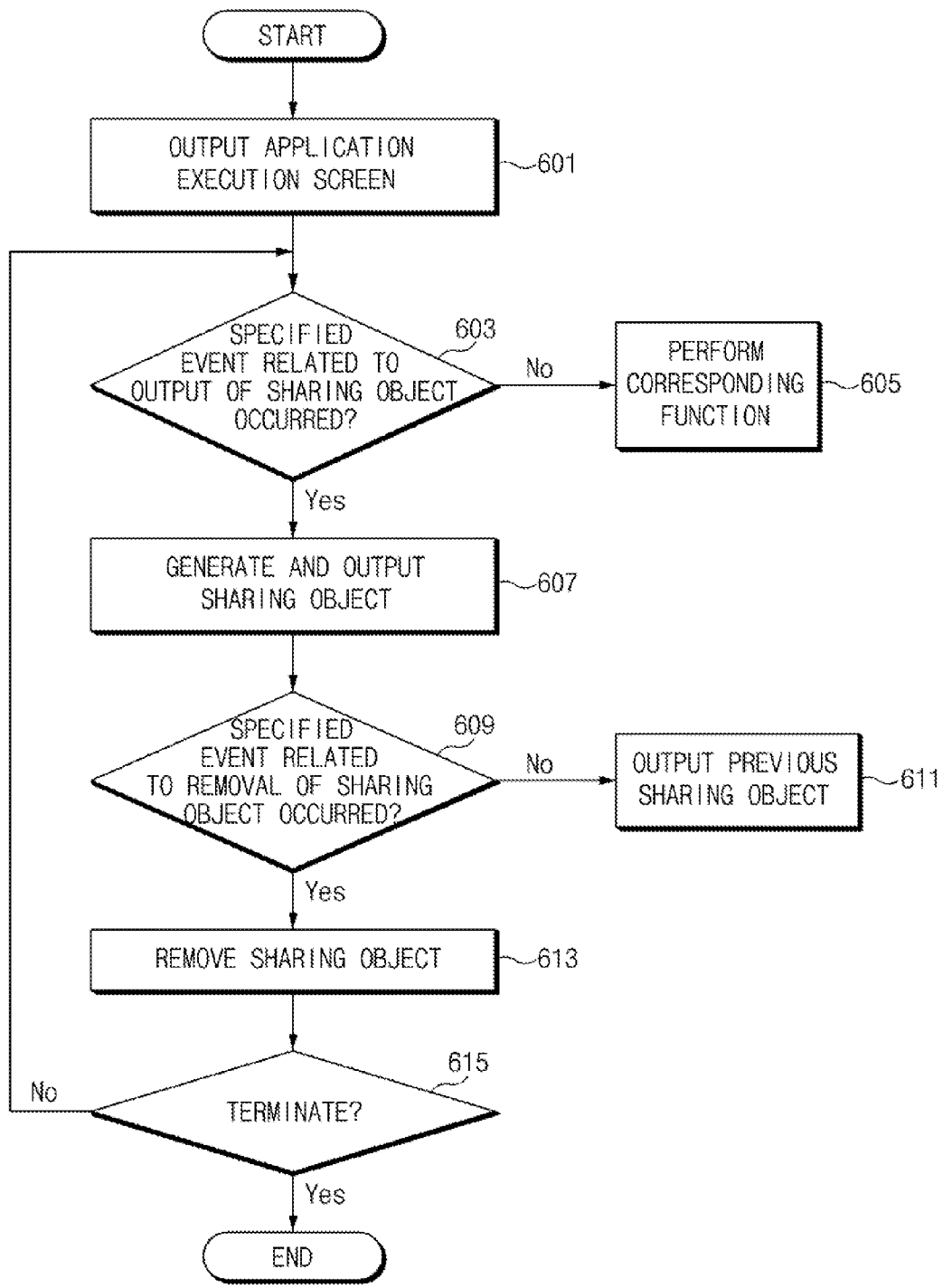
FIG. 6 is a diagram illustrating a content sharing method related to displaying of a sharing object according to various embodiments of the present disclosure.

FIG. 6 is a diagram illustrating a content sharing method related to displaying of a sharing object according to various embodiments of the present disclosure.

Referring to FIG. 6, in operation 601, the processor 200 (shown in FIG. 2) may output an application execution screen. For example, the processor 200 may output at least one icon or menu related to execution of an application, and may output the application execution screen in response to an input event. Alternatively, the processor 200 may execute an application according to a specified schedule, and may output the application execution screen. According to various embodiments of the present disclosure, the processor 200 may output an execution screen of a specific application as a sleep state is released or a locked screen is unlocked.

Referring to FIG. 6, if an event occurs, the processor 200 (e.g., the sharing object handling module 220, shown in FIG. 2) may determine whether the event is a specified event related to output of a sharing object in operation 603. For example, the processor 200 may output, to the application execution screen, at least one virtual button related to output of the sharing object. Alternatively, the processor 200 may set a sharing object output or removal function in association with at least one physical button (e.g., a volume button, a crown of a wearable watch, or the like). The processor 200 may determine whether an event corresponding to the above-mentioned virtual button or physical button occurs. According to various embodiments of the present disclosure, the processor 200 may determine whether an event of selecting sharable content (e.g., at least one of an image, audio information, or a text) from the application execution screen occurs. If the event of selecting sharable content occurs, the processor 200 may determine that this event is the specified event, and may perform operation 607.

Referring to FIG. 6, if the event is not the specified event, the processor 200 (shown in FIG. 2) may perform a function corresponding to the type of the event in operation 605. For example, if non-sharable content (e.g., content in which digital right management (DRM) is set, content set to be unable to be transmitted to an external electronic device, or a program which is unable to be transmitted to an external electronic device) or a user interface is selected, the processor 200 may handle execution of a function according to the selection. According to an embodiment of the present disclosure, the processor 200 may execute non-sharable content. Alternatively, the processor 200 may handle execution of a function in response to execution of a corresponding program.

Referring to FIG. 6, if the specified event occurs, the processor 200 (e.g., the sharing object handling module 220) may generate and output a sharing object in operation 607. For example, the processor 200 may output the sharing object if an event of selecting content having a sharing function occurs or an application related to a sharing function is executed. Alternatively, the processor 200 may generate and output the sharing object if a virtual button or a physical button for requesting output of the sharing object is selected.

Referring to FIG. 6, if an event occurs while the sharing object is output, the processor 200 (e.g., the sharing object handling module 220, shown in FIG. 2) may determine whether the event is a specified event related to removal of the sharing object in operation 609. For example, when the sharing object is output to the application execution screen, the processor 200 may set a physical button or may provide a virtual button related to removal of the sharing object. If the event is not the specified event related to removal of the sharing object, the processor 200 may perform a function corresponding to the type of the event in operation 611. For example, if selection of content (e.g., selection of an icon, an image, a text, or the like) related to operation of the sharing object occurs, the processor 200 may perform content sharing. Alternatively, if execution of content is requested, the processor 200 may output information (e.g., an image, a text, or audio information) according to execution of the content.

Referring to FIG. 6, if the specified event related to removal of the sharing object occurs, the processor 200 (e.g., the sharing object handling module 220) may remove the sharing object in operation 613. For example, if a virtual button or a physical button related to removal of the sharing object is selected, the processor 200 (shown in FIG. 2) may remove the sharing object which is being output.

Referring to FIG. 6, in operation 615, the processor 200 may determine whether an event related to application termination occurs. If the event related to application termination does not occur, the process may return to operation 603 so that the processor 200 may re-perform operation 603 and the following operations. If the event related to application termination occurs, the processor 200 may terminate an application.

According to the above-mentioned various embodiments of the present disclosure, a method for content sharing may include receiving an event corresponding to an execution of a specified application related to sharable content or selection of the sharable content, and outputting, to an execution screen of the specified application, a sharing object set to transmit the selected content to all or at least one of a plurality of external electronic devices.

According to the embodiments of the present disclosure, the outputting may include outputting the sharing object comprising sub objects respectively corresponding to the plurality of external electronic devices and a common object set to transmit the content to all the plurality of external electronic devices.

According to the embodiments of the present disclosure, the outputting may include outputting the sharing object comprising a sub object related to identification information of a currently connected external electronic device.

According to the embodiments of the present disclosure, the content sharing method may further include receiving a change of information on a connection to the external electronic devices and changing and displaying the sharing object in response to the change of the information on connection.

According to the embodiments of the present disclosure, the displaying may include displaying the sharing object comprising a sub object corresponding to a newly additionally connected external electronic device.

According to the embodiments of the present disclosure, in response to disconnection of the external electronic device, the displaying may include displaying the sharing object from which a sub object corresponding to an external electronic device has been removed.

According to the embodiments of the present disclosure, the content sharing method may further include receiving a specified input event and displaying a sub object selected by the specified input event such that the sub object has a form corresponding to a content-transmission-disabled state.

According to the embodiments of the present disclosure, the outputting may include differently displaying at least one of a position, a size, a shape, a color, or brightness of the sharing object according to at least one of a specified input event, types of connected external electronic devices, distances to the external electronic devices, or a history of content transmission to the external electronic devices.

According to the embodiments of the present disclosure, the content sharing method may further include outputting a virtual button related to output of the sharing object or a virtual button related to removal of the sharing object.

According to the embodiments of the present disclosure, when the content is transmitted, information corresponding to a transmission state in association with the sharing object, the content sharing method may further include displaying, e.g., the sharing object.

Figure 7:
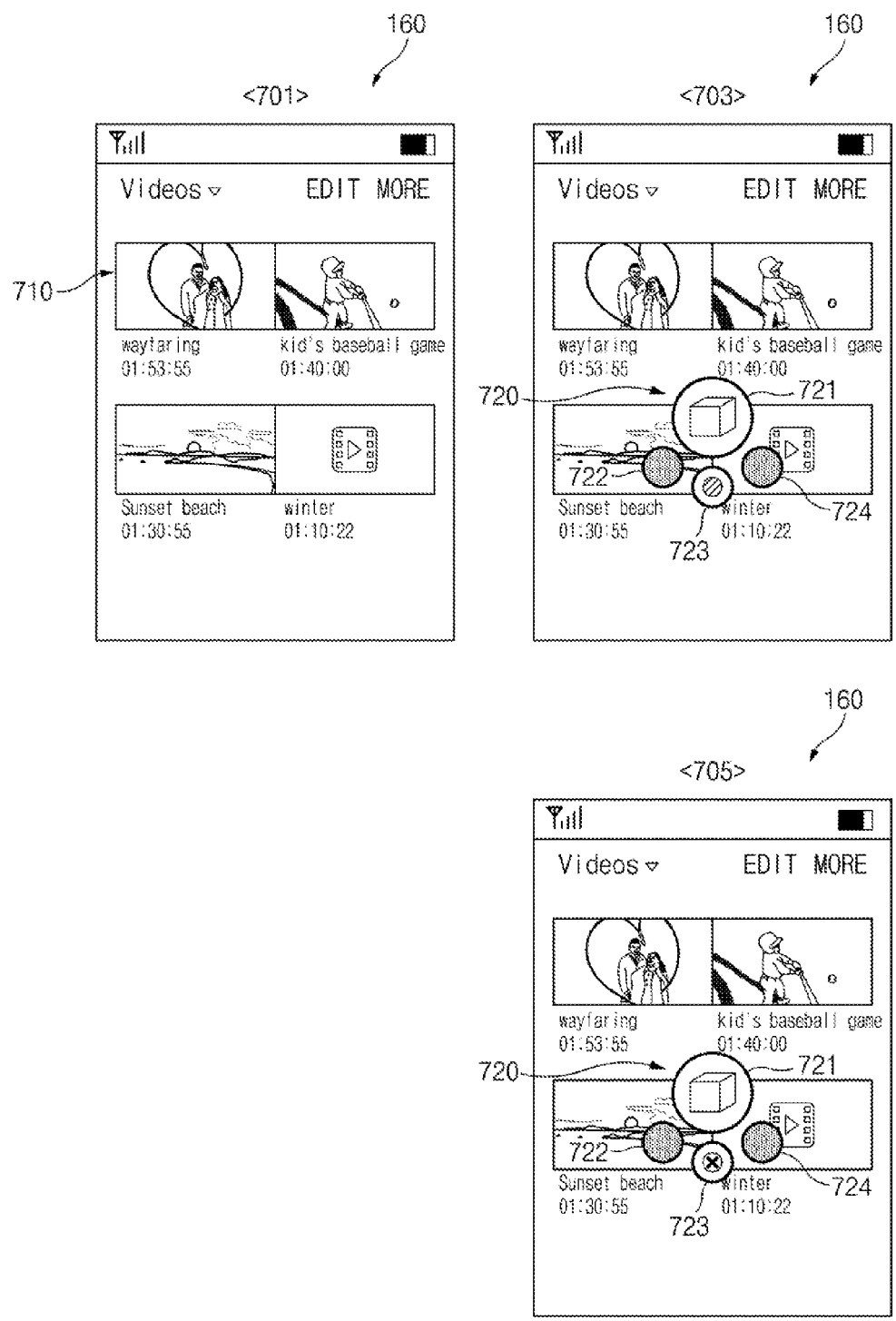
FIG. 7 is a diagram illustrating an example of a screen interface related to output of a sharing object according to various embodiments of the present disclosure.

FIG. 7 is a diagram illustrating an example of a screen interface related to output of a sharing object according to various embodiments of the present disclosure.

Referring to FIG. 7, as shown in a state <701>, the electronic device 100 may output, to the display 160, an item 710 corresponding to at least one piece of content. For example, the item 710 may include a thumbnail corresponding to content such as a photograph, a picture, or the like. Alternatively, the item 710 may be an icon corresponding to a video file, an audio file, or the like.

With reference to FIG. 7, as shown in a state <703>, the electronic device 100 (shown in FIG. 1) may output a sharing object 720 to one side of the display 160. For example, the electronic device 100 may output the sharing object 720 within a certain time (or substantially at the same time as an application execution screen is output) after an application execution screen (e.g., the screen of the state <701>) related to at least one piece of content which enables execution of a sharing function is output. Alternatively, in the case where the item 710 selected from the application execution screen is related to content which enables execution of a sharing function, the electronic device 100 may output the sharing object 720. Alternatively, in the state <701>, the electronic device 100 may output an icon or the like related to output of the sharing object 720 to one side of the display 160 (shown in FIG. 1), and may output the sharing object 720 when the icon is selected. According to an embodiment of the present disclosure, the sharing object 720 may include a sub object 722, a sub object 723, a sub object 724, and a common object 721. The sub objects 722 to 724, for example, may correspond to external electronic devices which currently establish a specified communication channel (e.g., a short-range communication channel) to the electronic device 100. Alternatively, the sub objects 722 to 724 may correspond to external electronic devices selected according to a setting (e.g., external electronic devices selected regardless of an establishment state of a communication channel). Alternatively, the sub objects 722 to 724 may correspond to external electronic devices selected by a user from among external electronic devices capable of establishing a communication channel according to at least one communication method.

According to various embodiments of the present disclosure, with reference to FIG. 7, the sub objects 722 to 724 may correspond to external electronic devices which fall within a specified range with respect to a recent content sharing history of the electronic device 100. For example, the sub objects 722 to 724 may correspond to external electronic devices having a certain ranking or higher in order from most recent sharing to least recent sharing among content-sharing external electronic devices. Alternatively, the sub objects 722 to 724 may correspond to external electronic devices having a history of having shared content within a specified period of past time (e.g., one hour, one day, or one week).

Referring to FIG. 7, the common object 721, for example, may be set to integrally transmit specified content to all of the sub objects 722 to 724 by one input. According to an embodiment of the present disclosure, the common object 721 may be larger or brighter than the sub objects 722 to 724. The sharing object 720 may be overlaid on the application execution screen.

According to various embodiments of the present disclosure, the electronic device 100 (or the processor 120 of the electronic device 100 shown in FIG. 1 or the processor 200 shown in FIG. 2) may receive an input event of selecting a specific sub object, for example, the sub object 723. In response to the input event, the electronic device 100 may change a display state of the sub object 723 as shown in the state <703>. For example, the electronic device 100 may display the sub object 723 in gray color or may change it into a specific shape. In this operation, the electronic device 100 may set or display a function related to the sub object 723 as an inactivation state (or a non-transmittable state). For example, when transmitting content related to the item 710, the electronic device 100 may not transmit the content to an external electronic device related to the sub object 723. The sub object 722 and the sub object 724 may have a previous display state (e.g., the display state as shown in the state <705>). Furthermore, these sub objects may be used to transmit content to corresponding external electronic devices when a request for executing a sharing function based on the item 710 is made.

Figure 8:
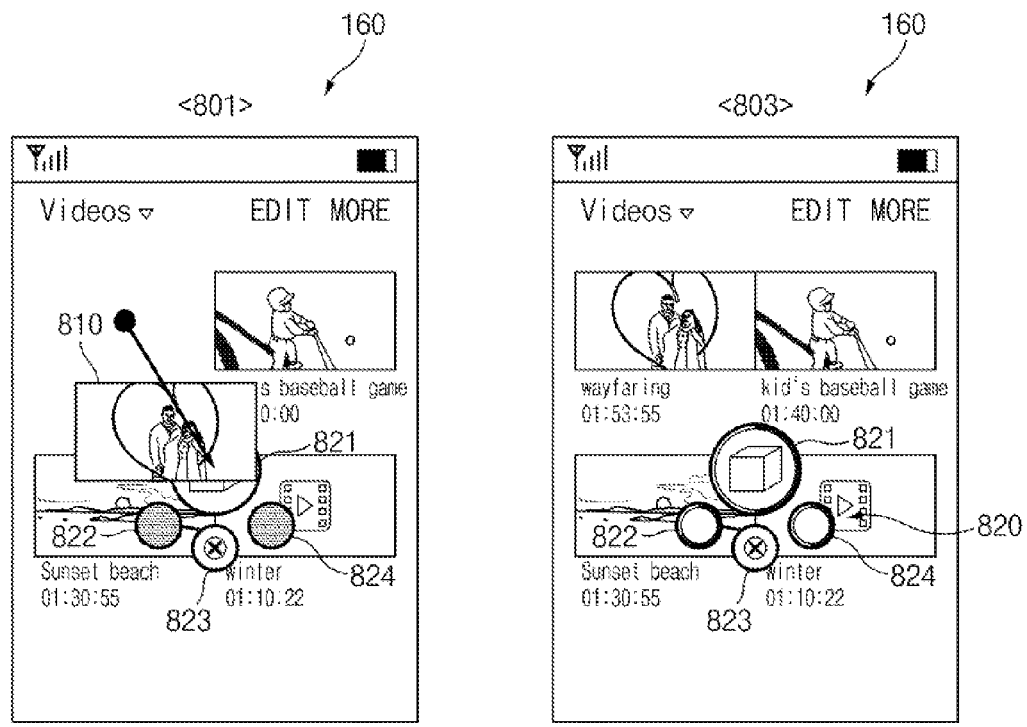
FIG. 8 is a diagram illustrating an example of a screen interface related to a content sharing function according to various embodiments of the present disclosure.

FIG. 8 is a diagram illustrating an example of a screen interface related to a content sharing function according to various embodiments of the present disclosure.

Referring to FIG. 8, as shown in a state <801>, the electronic device 100 may output a specified application execution screen to the display 160, and may output a sharing object 820 to the specified application execution screen. The sharing object 820, shown in a state <803>, may include, for example, a sub object 822, a sub object 823, a sub object 824, and a common object 821. Here, the sub object 823 may have a state in which content is unable to be transmitted. The sharing object 820 may be overlaid on the application execution screen. According to an embodiment of the present disclosure, the application execution screen may output at least one item. The at least one item, for example, may be related to content. If a specified event related to a specific item 810 (e.g., an event of selecting the specific item 810 and then dragging it to the sharing object 820) occurs, the electronic device 100 may display the specific item 810 so that the specific item 810 overlaps the sharing object 820.

Referring to FIG. 8, if a specified event (e.g., a touch release event) occurs while the specific item 810 overlaps the sharing object 820, the electronic device 100 (shown in FIG. 1) may transmit content corresponding to the item 810 to external electronic devices. For example, as shown in the state <801>, if a touch release event occurs while at least a part of the specific item 810 overlaps the common object 821, the electronic device 100 (shown in FIG. 1) may transmit the content corresponding to the specific item 810 to external electronic devices corresponding to the sub object 822 and the sub object 824. In this operation, as shown in FIG. 8, the electronic device 100 may output a display effect (e.g., a circular progress bar) corresponding to a content transmission state to certain regions of the sub objects (e.g., an edge of the sub object 822 and an edge of the sub object 824).

Figure 9:
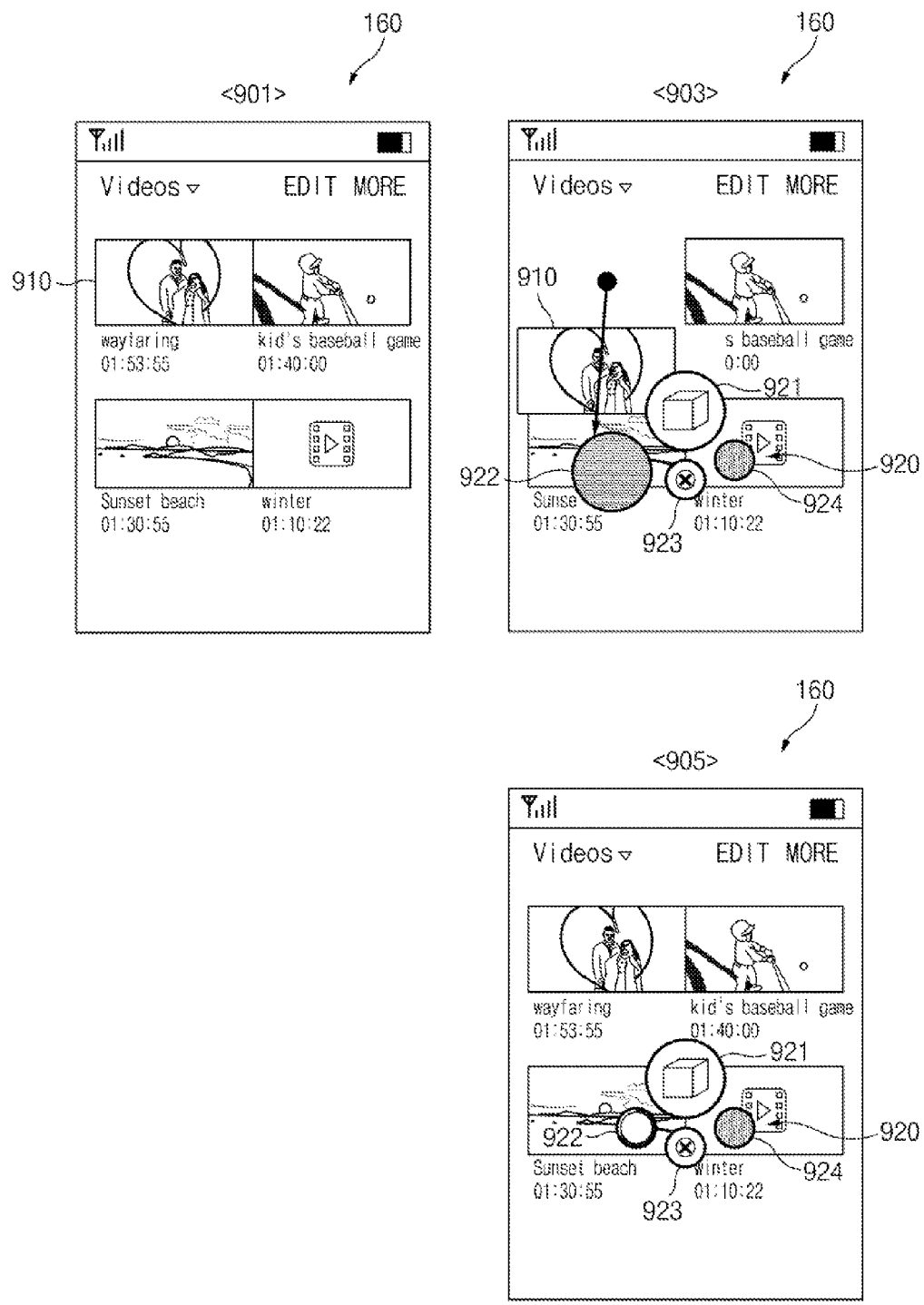
FIG. 9 is a diagram illustrating another example of a screen interface related to a content sharing function according to various embodiments of the present disclosure.

FIG. 9 is a diagram illustrating another example of a screen interface related to a content sharing function according to various embodiments of the present disclosure.

Referring to FIG. 9, as shown in a state <901>, the electronic device 100 (shown in FIG. 1) may output an application execution screen in response to execution of a specified application. According to an embodiment of the present disclosure, the application execution screen may include an item 910 related to at least one piece of sharable content. The at least one piece of sharable content may include, for example, an image, a video, etc. Alternatively, the at least one piece of sharable content may include a text, a document, audio information, etc. According to an embodiment of the present disclosure, if an event of selecting the specific item 910 occurs, the electronic device 100 may make a display state of the selected item 910 different from display states of other items. For example, the electronic device 100 may display the selected item 910 on a layer different from layers of other items. If an event (e.g., a drag event) related to the selected item 910 occurs, the electronic device 100 may change a display position of the selected item 910 in response to the event.

According to an embodiment of the present disclosure, with reference to FIG. 9, as shown in a state <903>, the electronic device 100 may output, to the display 160, a sharing object 920 including sub objects 922, 923, and 924 and a common object 921. If the selected item 910 overlap the sub object 922, the electronic device 100 may change a display state of the sub object 922. For example, the electronic device 100 may display the sub object 922 so that the sub object 922 is larger or brighter than the other sub objects. If a specified event (e.g., a touch release event) occurs while at least a part of the selected item 910 overlaps the sub object 922, the electronic device 100 may output a user interface related to content transmission as shown in a state <905>. For example, in relation to the sub object 922, the electronic device 100 may display a display effect (e.g., a circular progress bar) corresponding to a transmission state of content related to the selected item 910.

Figure 10:
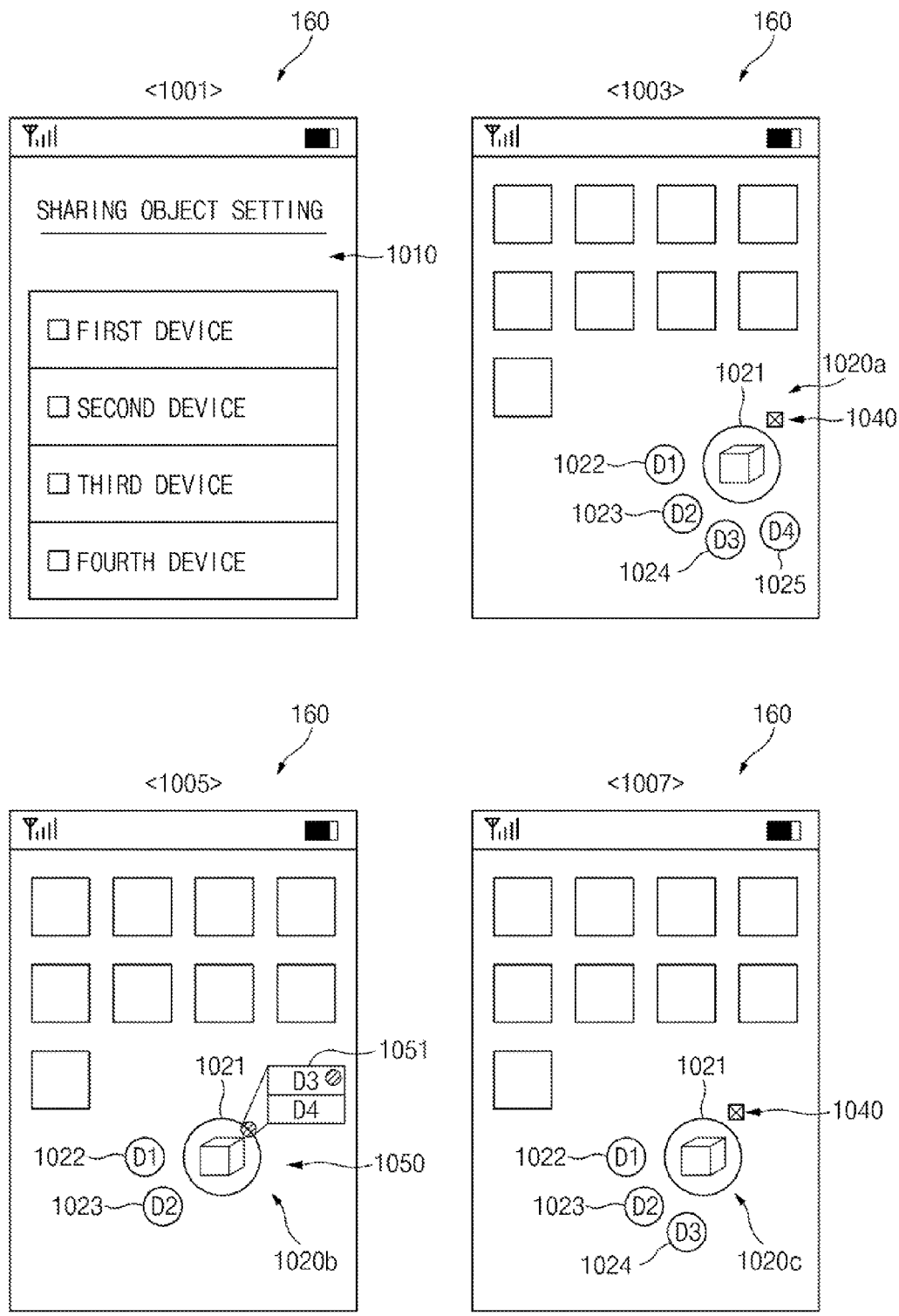
FIG. 10 is a diagram illustrating a screen interface related to a sharing object setting according to various embodiments of the present disclosure.

FIG. 10 is a diagram illustrating a screen interface related to a sharing object setting according to various embodiments of the present disclosure.

Referring to FIG. 10, if an event related to a sharing object setting occurs, the electronic device 100 (shown in FIG. 1) may output a sharing object setting screen to the display 160 (shown in FIG. 1) as shown in a state <1001>. In relation to this operation, the electronic device 100 may provide an icon or a menu related to the sharing object setting. The sharing object setting screen may include, for example, a sharing object setting list 1010. The sharing object setting list 1010 may include an identification item of at least one external electronic device. According to an embodiment of the present disclosure, the sharing object setting list 1010 may include the identification items of external electronic devices currently connected based on a specified communication method. Alternatively, the sharing object setting list 1010 may include the identification items of external electronic devices having a history of having performed content sharing within a specified period of time.

Referring to FIG. 10, in the case where all of the identification items of the external electronic devices included in the sharing object setting list 1010 are applied to display sub objects, the electronic device 100 may output, to the display 160, a sharing object 1020a including four sub objects 1022, 1023, 1024, and 1025 and a common object 1021 as shown in a state <1003>. For example, the sub object 1022 may correspond to a first device, the sub object 1023 may correspond to a second device, and the sub object 1024 may correspond to a third device. Furthermore, the sub object 1025 may correspond to a fourth device. According to various embodiments of the present disclosure, the sharing object 1020a may include a virtual removal button 1040 related to removal of the sharing object. For example, if the virtual removal button 1040 is selected, the sharing object 1020a may be removed from the display 160 (or an application execution screen).

According to various embodiments of the present disclosure, in the case where some of the identification items (e.g., the first device and the second device) of the external electronic devices included in the sharing object setting list 1010 (shown in FIG. 10) are selected, the electronic device 100 may output a sharing object 1020b including the sub object 1022, the sub object 1023, and the common object 1021 as shown in a state <1005>. According to an embodiment of the present disclosure, with reference to the state <1005>, if a specified event (e.g., a specified touch event for selecting the common object 1021) occurs on a certain region of the sharing object 1020b, the electronic device 100 may output a sharing item window 1050. The sharing item window 1050 may include, for example, identification items not selected from the sharing object setting list 1010. For example, the sharing item window 1050 may include the identification item corresponding to the third device and the identification item corresponding to the fourth device.

If a specific identification item, for example, an identification item 1051 (shown in the state <1005> of FIG. 10) corresponding to the third device is selected from the sharing item window 1050, the electronic device 100 may output a sharing object 1020c including the sub object 1024 corresponding to the third device as shown in a state <1007>. The sharing object 1020c, for example, may include the virtual removal button 1040, as shown in the state <1007> of FIG. 10.

Figure 11:
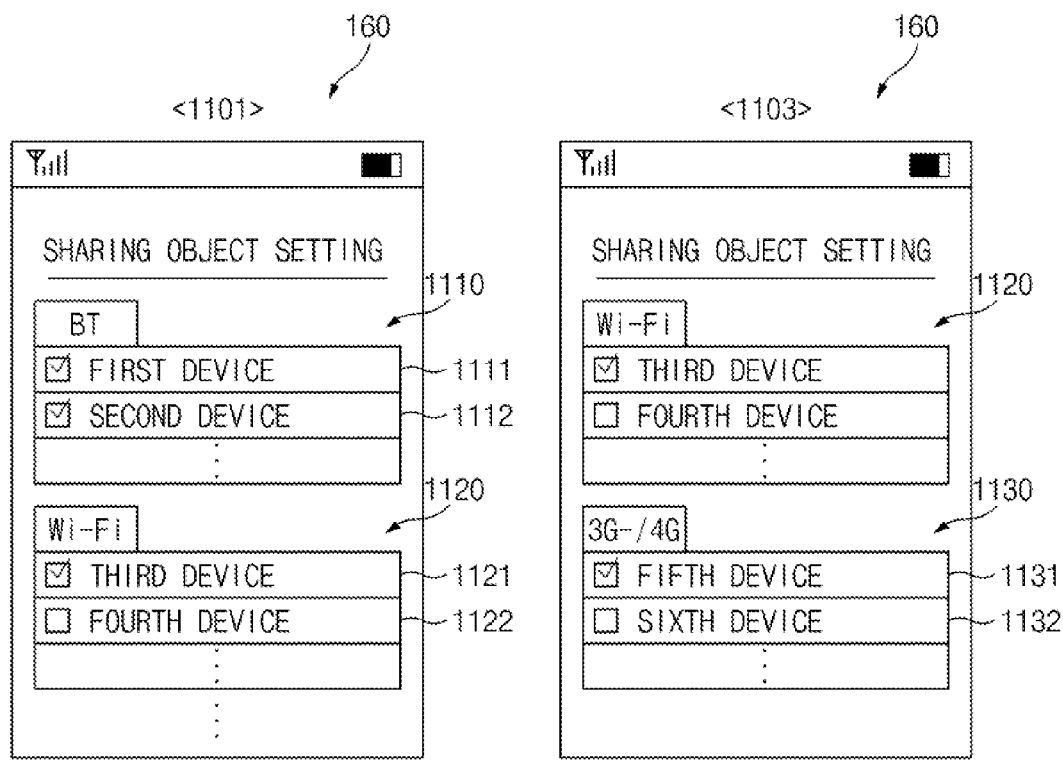
FIG. 11 is a diagram illustrating another example of a screen interface related to a sharing object setting according to various embodiments of the present disclosure.

FIG. 11 is a diagram illustrating another example of a screen interface related to a sharing object setting according to various embodiments of the present disclosure.

Referring to FIG. 11, if an event related to a sharing object setting occurs, the electronic device 100 (shown in FIG. 1) may output a sharing object setting screen to the display 160 as shown in a state <1101>. According to an embodiment of the present disclosure, the sharing object setting screen may include lists grouped according to a communication method (or a communication module). For example, the sharing object setting screen may include a sharing list 1110 based on a first communication method and a sharing list 1120 based on a second communication method. Furthermore, the sharing object setting screen may include a list 1130 based on a third communication method as shown in a state <1103> in FIG. 11. The sharing list 1130 may be output in response to a specified event such as a scroll event, after not being displayed on the sharing object setting screen. As the scroll event occurs, the sharing list 1110 may be hidden from the display 160 (shown in FIG. 1) while the sharing list 1130 is output.

Referring to FIG. 11, the sharing list 1110 may include, for example, a first device item 1111 and a second device item 1112 connected using a Bluetooth communication method. The first device item 1111 and the second device item 1112 may correspond to external electronic devices which currently establish a communication channel to the electronic device 100 (shown in FIG. 1) based on the BT communication method. Each of the first device item 1111 and the second device item 1112 may include a virtual selection button. According to an embodiment of the present disclosure, a state in which the virtual selection buttons are checked may indicate that external electronic devices corresponding to the first device item 1111 and the second device item 1112 are currently connected.

Referring to FIG. 11, the sharing list 1120 may include, for example, a third device item 1121 and a fourth device item 1122 connected using a Wi-Fi communication method or a Wi-Fi direct communication method. Each of the third device item 1121 and the fourth device item 1122 may include a virtual selection button indicating a connection state or whether each of the items is selected. A state in which the virtual selection button of the third device item 1121 is checked may indicate that an external electronic device corresponding to the third device item 1121 is currently connected to the electronic device 100 using the Wi-Fi communication method. A state in which the virtual selection button of the fourth device item 1122 is not checked may indicate that an external electronic device corresponding to the fourth device item 1122 is not connected to the electronic device 100. The fourth device item 1122, for example, may be included in the sharing list 1120 in association with an external electronic device item having a previous content transmission history or a previous communication connection history. According to various embodiments of the present disclosure, even if an external electronic device corresponding to the fourth device item 1122 is currently connected to the electronic device 100, the virtual selection button of the fourth device item 1122 may not be checked in response to a user's selection. If the virtual selection button of the fourth device item 1122 is not checked, a sub object related to the fourth device item 1122 may not be added to a sharing object when the sharing object is generated. Alternatively, the electronic device 100 may add the sub object related to the fourth device item 1122 to the sharing object, but may set a state of the sub object as an inactivated state (e.g., a state in which content is unable to be transmitted).

Referring to FIG. 11, the sharing list 1130 may include, for example, a fifth device item 1131 and a sixth device item 1132 (shown in the state <1103> in FIG. 11) that are connectable based on a mobile communication method. According to an embodiment of the present disclosure, the sharing list 1130 may include a phonebook list of the electronic device 100. The fifth device item 1131, for example, may correspond to an external electronic device having a history of having been connected within a specified first past time (e.g., 10 minutes or one hour) among external electronic devices having a history of having been connected using the third communication method. Alternatively, the fifth device item 1131 may represent an item set to be added as a sub object of a sharing object in response to a user input. The sixth device item 1132 may correspond to an external electronic device having a history of having been connected within a specified second past time (e.g., a time longer than the first time, for example, one day). The sixth device item 1132 may not be selected in response to a user input.

Figure 12:
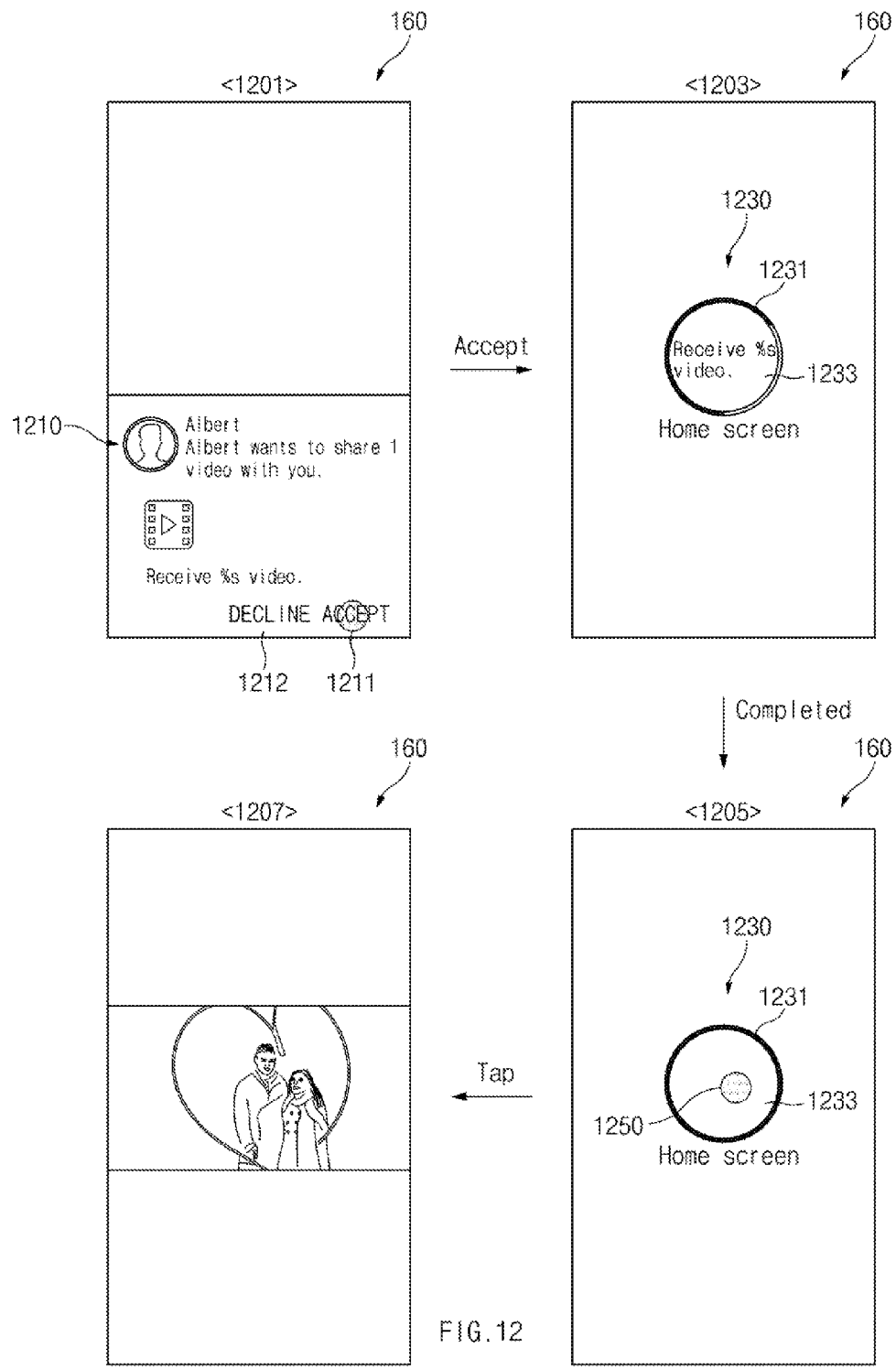
FIG. 12 is a diagram illustrating an example of a screen interface related to reception of content according to various embodiments of the present disclosure.

FIG. 12 is a diagram illustrating an example of a screen interface related to reception of content according to various embodiments of the present disclosure.

Referring to FIG. 12, the electronic device 100 (shown in FIG. 1) may receive a message related to content sharing from an external electronic device. The electronic device 100 may output a reception guide message 1210 in response to the reception of the message as shown in a state <1201>. The reception guide message 1210 may include, for example, identification information related to an external electronic device which has transmitted content, information corresponding to the type of the content, etc. Furthermore, the reception guide message 1210 may include, for example, a virtual accept button 1211 for allowing reception of content and a virtual decline button 1212 for declining reception of content.

If the virtual accept button 1211 is selected, the electronic device 100 may receive content. In relation to the reception of content, the electronic device 100 may output a reception sharing object 1230 as shown in a state <1203>. The reception sharing object 1230 may include, for example, a content information region 1233 and a content reception state display region 1231. The content reception state display region 1231 may include, for example, a circular progress bar. The content information region 1233 may include a received content name, a content reception ratio, etc.

Referring to FIG. 12, if the reception of content is completed, the electronic device 100 may output, to the display 160, the reception sharing object 1230 indicating a reception completed state as shown in a state <1205>. For example, the electronic device 100 may output the reception sharing object 1230 including the content information region 1233 and the content reception state display region 1231 which is disposed on a perimeter of the content information region 1233 and indicates the reception completed state. If a touch event 1250 for touching a certain region of the content information region 1233 occurs, the electronic device 100 may output a content playback screen to the display 160 as shown in a state <1207>.

Various embodiments of the present disclosure may provide an environment in which sharing of content with a plurality of external electronic devices may be handled with ease and quickly.

Figure 13:
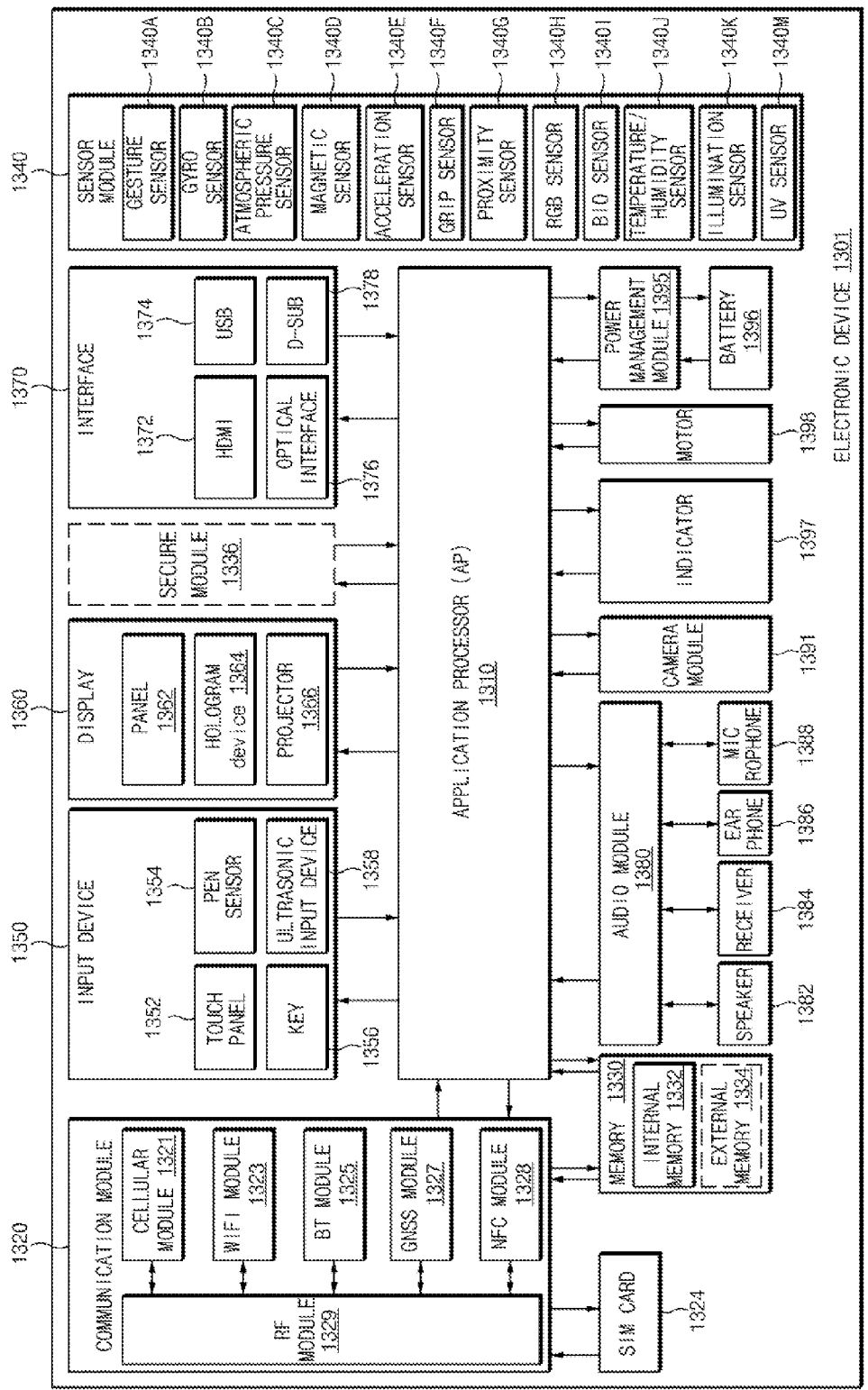
FIG. 13 is a block diagram illustrating a configuration of an electronic device according to various embodiments of the present disclosure.

FIG. 13 is a block diagram illustrating a configuration of an electronic device according to various embodiments of the present disclosure.

Referring to FIG. 13, the electronic device 1301 may include, for example, all or part of an electronic device 100 shown in FIG. 1. The electronic device 1301 may include one or more processors 1310 (e.g., application processors (APs)), a communication module 1320, a subscriber identification module (SIM) 1324, a memory 1330, a secure module 1336, a sensor module 1340, an input device 1350, a display 1360, an interface 1370, an audio module 1380, a camera module 1391, a power management module 1395, a battery 1396, an indicator 1397, and a motor 1398.

Referring to FIG. 13, the processor 1310 may drive, for example, an operating system (OS) or an application program to control a plurality of hardware or software components connected thereto and may process and compute a variety of data. The processor 1310 may be implemented with, for example, a system on chip (SoC). According to an embodiment, the processor 1310 may include a graphic processing unit (GPU) (not shown) and/or an image signal processor (ISP) (not shown). The processor 1310 may include at least some (e.g., a cellular module 1321) of the components shown in FIG. 13. The processor 1310 may load a command or data received from at least one of other components (e.g., a non-volatile memory) into a volatile memory to process the data and may store various data in a non-volatile memory.

Referring to FIG. 13, the communication module 1320 may have the same or similar configuration to a communication interface 170 (shown in FIG. 1). The communication module 1320 may include, for example, the cellular module 1321, a wireless-fidelity (Wi-Fi) module 1323, a Bluetooth (BT) module 1325, a global navigation satellite system (GNSS) module 1327 (e.g., a GPS module, a Glonass module, a Beidou module, or a Galileo module), a near field communication (NFC) module 1328, an MST module (not shown), and a radio frequency (RF) 1329.

Referring to FIG. 13, the cellular module 1321 may provide, for example, a voice call service, a video call service, a text message service, or an Internet service, and the like through a communication network. According to an embodiment, the cellular module 1321 may identify and authenticate the electronic device 1301 in a communication network using the SIM 1324 (e.g., a SIM card). According to an embodiment, the cellular module 1321 may perform at least part of functions which may be provided by the processor 1310. According to an embodiment, the cellular module 1321 may include a communication processor (CP).

Referring to FIG. 13, the Wi-Fi module 1323, the BT module 1325, the GNSS module 1327, the NFC module 1325, or the MST module (not shown) may include, for example, a processor for processing data transmitted and received through the corresponding module. According to various embodiments, at least some (e.g., two or more) of the cellular module 1321, the Wi-Fi module 1323, the BT module 1325, the GNSS module 1327, the NFC module 1325, or the MST module (not shown) may be included in one integrated chip (IC) or one IC package.

Referring to FIG. 13, the RF module 1329 may transmit and receive, for example, a communication signal (e.g., an RF signal). Though not shown, the RF module 1329 may include, for example, a transceiver, a power amplifier module (PAM), a frequency filter, or a low noise amplifier (LNA), or an antenna, and the like. According to another embodiment, at least one of the cellular module 1321, the Wi-Fi module 1323, the BT module 1325, the GNSS module 1327, the NFC module 1325, or the MST module (not shown) may transmit and receive an RF signal through a separate RF module.

Referring to FIG. 13, the SIM 1324 may include, for example, a card which includes a SIM and/or an embedded SIM. The SIM 1324 may include unique identification information (e.g., an integrated circuit card identifier (ICCID)) or subscriber information (e.g., an international mobile subscriber identity (IMSI)).

Referring to FIG. 13, the memory 1330 (e.g., a memory 130 FIG. 1) may include, for example, an internal memory (embedded memory) 1332 and/or an external memory 1334. The embedded memory 1332 may include at least one of, for example, a volatile memory (e.g., a dynamic random access memory (DRAM), a static RAM (SRAM), a synchronous dynamic RAM (SDRAM), and the like), or a non-volatile memory (e.g., a one-time programmable read only memory (OTPROM), a programmable ROM (PROM), an erasable and programmable ROM (EPROM), an electrically erasable and programmable ROM (EEPROM), a mask ROM, a flash ROM, a flash memory (e.g., a NAND flash memory or a NOR flash memory, and the like), a hard drive, or a solid state drive (SSD)).

Referring to FIG. 13, the external memory 1334 may include a flash drive, for example, a compact flash (CF), a secure digital (SD), a micro-SD, a mini-SD, an extreme digital (xD), a multimedia car (MMC), or a memory stick, and the like. The external memory 1334 may operatively and/or physically connect with the electronic device 1301 through various interfaces.

Referring to FIG. 13, the secure module 1336 may be a module which has a relatively higher secure level than the memory 1330 and may be a circuit which stores secure data and guarantees a protected execution environment. The secure module 1336 may be implemented with a separate circuit and may include a separate processor. The secure module 1336 may include, for example, an embedded secure element (eSE) which is present in a removable smart chip or a removable SD card or is embedded in a fixed chip of the electronic device 1301. Also, the secure module 1336 may be driven by an OS different from the OS of the electronic device 1301. For example, the secure module 1336 may operate based on a java card open platform (JCOP) OS.

Referring to FIG. 13, the sensor module 1340 may measure, for example, a physical quantity or may detect an operation state of the electronic device 1301, and may convert the measured or detected information to an electric signal. The sensor module 1340 may include at least one of, for example, a gesture sensor 1340A, a gyro sensor 1340B, an atmospheric pressure sensor 1340C, a magnetic sensor 1340D, an acceleration sensor 1340E, a grip sensor 1340F, a proximity sensor 1340G, a color sensor 1340H (e.g., red, green, blue (RGB) sensor), a biometric (BIO) sensor 1340I, a temperature/humidity sensor 1340J, an illumination sensor 1340K, or an ultraviolet (UV) sensor 1340M. Additionally or alternatively, the sensor module 1340 may further include, for example, an electronic nose (e-nose) sensor (not shown), an electromyography (EMG) sensor (not shown), an electroencephalogram (EEG) sensor (not shown), an electrocardiogram (ECG) sensor (not shown), an infrared (IR) sensor (not shown), an iris sensor (not shown), and/or a fingerprint sensor (not shown), and the like. The sensor module 1340 may further include a control circuit for controlling at least one or more sensors included therein. According to various embodiments, the electronic device 1301 may further include a processor configured to control the sensor module 1340, as part of the processor 1310 or to be independent of the processor 1310. While the processor 1310 is in a sleep state, the electronic device 1301 may control the sensor module 1340.

Referring to FIG. 13, the input device 1350 may include, for example, a touch panel 1352, a digital stylus or (digital) pen sensor 1354, a key 1356, or an ultrasonic input unit 1358. The touch panel 1352 may use at least one of, for example, a capacitive type, a resistive type, an infrared type, or an ultrasonic type. Also, the touch panel 1352 may further include a control circuit. The touch panel 1352 may further include a tactile layer and may provide a tactile reaction to a user.

Referring to FIG. 13, the digital stylus or (digital) pen sensor 1354 may be, for example, part of the touch panel 1352 or may include a separate sheet for recognition. The key 1356 may include, for example, a physical button, an optical key, or a keypad. The ultrasonic input unit 1358 may allow the electronic device 1301 to detect a sound wave using a microphone (e.g., a microphone 1388) and to verify data through an input tool generating an ultrasonic signal.

Referring to FIG. 13, the display 1360 (e.g., a display 160 shown in FIG. 1) may include a panel 1362, a hologram device 1364, or a projector 1366. The panel 1362 may include the same or similar configuration to the display 160. The panel 1362 may be implemented to be, for example, flexible, transparent, or wearable. The panel 1362 and the touch panel 1352 may be integrated into one module. The hologram device 1364 may show a stereoscopic image in a space using interference of light. The projector 1366 may project light onto a screen to display an image. The screen may be positioned, for example, inside or outside the electronic device 1301. According to an embodiment, the display 1360 may further include a control circuit for controlling the panel 1362, the hologram device 1364, or the projector 1366.

Referring to FIG. 13, the interface 1370 may include, for example, a high-definition multimedia interface (HDMI) 1372, a USB 1374, an optical interface 1376, or a D-subminiature 1378. The interface 1370 may be included in, for example, a communication interface 170 shown in FIG. 1. Additionally or alternatively, the interface 1370 may include, for example, a mobile high definition link (MHL) interface, an SD card/MMC interface, or an infrared data association (IrDA) standard interface.

Referring to FIG. 13, the audio module 1380 may convert a sound and an electric signal in dual directions. At least part of components of the audio module 1380 may be included in, for example, an input and output interface 150 shown in FIG. 1. The audio module 1380 may process sound information input or output through, for example, a speaker 1382, a receiver 1384, an earphone 1386, or the microphone 1388, and the like.

Referring to FIG. 13, the camera module 1391 may be a device which captures a still image and a moving image. According to an embodiment, the camera module 1391 may include one or more image sensors (not shown) (e.g., a front sensor or a rear sensor), a lens (not shown), an image signal processor (ISP) (not shown), or a flash (not shown) (e.g., an LED or a xenon lamp).

Referring to FIG. 13, the power management module 1395 may manage, for example, power of the electronic device 1301. According to an embodiment, though not shown, the power management module 1395 may include a power management integrated circuit (PMIC), a charger IC or a battery or fuel gauge. The PMIC may have a wired charging method and/or a wireless charging method. The wireless charging method may include, for example, a magnetic resonance method, a magnetic induction method, or an electromagnetic method, and the like. An additional circuit for wireless charging, for example, a coil loop, a resonance circuit, or a rectifier, and the like may be further provided. The battery gauge may measure, for example, the remaining capacity of the battery 1396 and voltage, current, or temperature thereof while the battery 1396 is charged. The battery 1396 may include, for example, a rechargeable battery or a solar battery.

Referring to FIG. 13, the indicator 1397 may display a specific state of the electronic device 1301 or part (e.g., the processor 1310) thereof, for example, a booting state, a message state, or a charging state, and the like. The motor 1398 may convert an electric signal into mechanical vibration and may generate vibration or a haptic effect, and the like. Though not shown, the electronic device 1301 may include a processing unit (e.g., a GPU) for supporting a mobile TV. The processing unit for supporting the mobile TV may process media data according to standards, for example, a digital multimedia broadcasting (DMB) standard, a digital video broadcasting (DVB) standard, or a mediaFlo™ standard, and the like.

Each of the above-mentioned elements of the electronic device according to various embodiments of the present disclosure may be configured with one or more components, and names of the corresponding elements may be changed according to the type of the electronic device. The electronic device according to various embodiments of the present disclosure may include at least one of the above-mentioned elements, some elements may be omitted from the electronic device, or other additional elements may be further included in the electronic device. Also, some of the elements of the electronic device according to various embodiments of the present disclosure may be combined with each other to form one entity, thereby making it possible to perform the functions of the corresponding elements in the same manner as before the combination.

Figure 14:
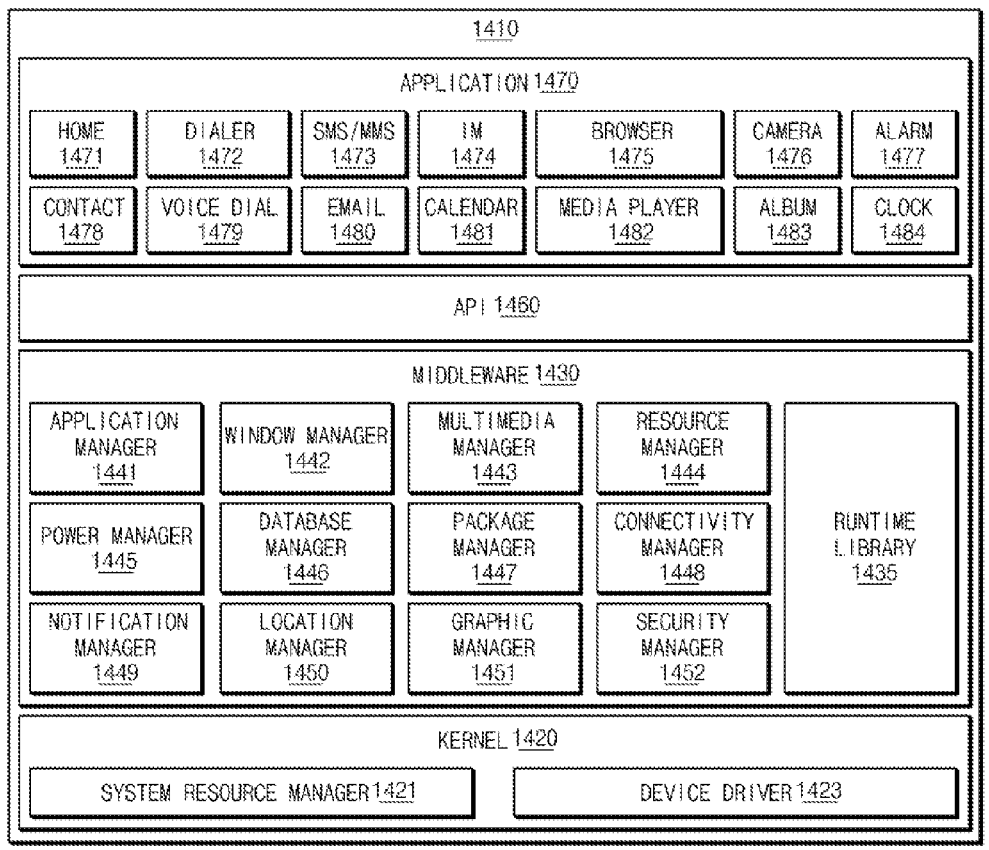
FIG. 14 is a block diagram illustrating a configuration of a program module 310 according to various embodiments of the present disclosure.

FIG. 14 is a block diagram illustrating a configuration of a program module 310 according to various embodiments of the present disclosure.

Referring to FIG. 14, the program module 1410 may include an operating system (OS) for controlling resources associated with an electronic device (e.g., an electronic device 100 shown in FIG. 1) and/or various applications (e.g., an application program 147 shown in FIG. 1) which are executed on the OS. The OS may be, for example, Android®, iOS®, Windows®, Symbian®, Tizen®, or Bada®, and the like.

Referring to FIG. 14, the program module 1410 may include a kernel 1420, a middleware 1430, an application programming interface (API) 1460, and/or an application 1470. At least part of the program module 1410 may be preloaded on the electronic device, or may be downloaded from an external electronic device (e.g., a first external electronic device 102, a second external electronic device 103, 105 or a server 106, and the like shown in FIG. 1).

Referring to FIG. 14, the kernel 1420 (e.g., a kernel 141 of FIG. 1) may include, for example, a system resource manager 1421 and/or a device driver 1423. The system resource manager 1421 may control, assign, or collect, and the like system resources. According to an embodiment, the system resource manager 1421 may include a process management unit, a memory management unit, or a file system management unit, and the like. The device driver 1423 may include, for example, a display driver, a camera driver, a BT driver, a shared memory driver, a USB driver, a keypad driver, a Wi-Fi driver, an audio driver, or an inter-process communication (IPC) driver.

Referring to FIG. 14, the middleware 1430 (e.g., a middleware 143 of FIG. 1) may provide, for example, functions the application 1470 needs in common, and may provide various functions to the application 1470 through the API 1460 such that the application 1470 efficiently uses limited system resources in the electronic device. According to an embodiment, the middleware 1430 (e.g., the middleware 143) may include at least one of a runtime library 1435, an application manager 1441, a window manager 1442, a multimedia manager 1443, a resource manager 1444, a power manager 1445, a database manager 1446, a package manager 1447, a connectivity manager 1448, a notification manager 1449, a location manager 1450, a graphic manager 1451, a security manager 1452, or a payment manager (not shown).

Referring to FIG. 14, the runtime library 1435 may include, for example, a library module used by a compiler to add a new function through a programming language while the application 1470 is executed. The runtime library 1435 may perform a function about input and output management, memory management, or an arithmetic function.

Referring to FIG. 14, the application manager 1441 may manage, for example, a life cycle of at least one of the application 1470. The window manager 1442 may manage graphic user interface (GUI) resources used on a screen of the electronic device. The multimedia manager 1443 may determine a format utilized for reproducing various media files and may encode or decode a media file using a codec corresponding to the corresponding format. The resource manager 1444 may manage source codes of at least one of the application 1470, and may manage resources of a memory or a storage space, and the like.

Referring to FIG. 14, the power manager 1445 may act together with, for example, a basic input/output system (BIOS) and the like, may manage a battery or a power source, and may provide power information utilized for an operation of the electronic device. The database manager 1446 may generate, search, or change a database to be used in at least one of the application 1470. The package manager 1447 may manage installation or update of an application distributed by a type of a package file.

Referring to FIG. 14, the connectivity manager 1448 may manage, for example, wireless connection such as Wi-Fi connection or BT connection, and the like. The notification manager 1449 may display or notify events, such as an arrival message, an appointment, and proximity notification, by a method which is not disturbed to the user. The location manager 1450 may manage location information of the electronic device. The graphic manager 1451 may manage a graphic effect to be provided to the user or a user interface (UI) related to the graphic effect. The security manager 1452 may provide all security functions utilized for system security or user authentication, and the like. According to an embodiment, when the electronic device (e.g., an electronic device 100 of FIG. 1) has a phone function, the middleware 1430 may further include a telephony manager (not shown) for managing a voice or video communication function of the electronic device.

Referring to FIG. 14, the middleware 1430 may include a middleware module which configures combinations of various functions of the above-described components. The middleware 1430 may provide a module which specializes according to kinds of OSs to provide a differentiated function. Also, the middleware 1430 may dynamically delete some of old components or may add new components.

Referring to FIG. 14, the API 1460 (e.g., an API 145 shown in FIG. 1) may be, for example, a set of API programming functions, and may be provided with different components according to OSs. For example, in case of Android® or iOS®, one API set may be provided according to platforms. In case of Tizen®, two or more API sets may be provided according to platforms.

Referring to FIG. 14, the application 1470 (e.g., an application program 147 shown in FIG. 1) may include one or more of, for example, a home application 1471, a dialer application 1472, a short message service/multimedia message service (SMS/MMS) application 1473, an instant message (IM) application 1474, a browser application 1475, a camera application 1476, an alarm application 1477, a contact application 1478, a voice dial application 1479, an e-mail application 1480, a calendar application 1481, a media player application 1482, an album application 1483, a clock application 1484, and additional applications (not shown), such as a health care application (e.g., an application for measuring quantity of exercise or blood sugar, and the like), or an environment information application (e.g., an application for providing atmospheric pressure information, humidity information, or temperature information, and the like), and the like.

According to an embodiment, with reference to FIG. 14, the application 1470 may include an application (hereinafter, for better understanding and ease of description, referred to as "information exchange application") for exchanging information between the electronic device (e.g., the electronic device 100 shown in FIG. 1) and an external electronic device (e.g., the first external electronic device 102 or the second external electronic device 105 shown in FIG. 1). The information exchange application may include, for example, a notification relay application for transmitting specific information to the external electronic device or a device management application for managing the external electronic device.

For example, the notification relay application may include a function of transmitting notification information, which is generated by other applications (e.g., the SMS/MMS application, the e-mail application, the health care application, or the environment information application, and the like) of the electronic device, to the external electronic device (e.g., the first external electronic device 102 or the second external electronic device 105 shown in FIG. 1). Also, the notification relay application may receive, for example, notification information from the external electronic device, and may provide the received notification information to the user of the electronic device.

The device management application may manage (e.g., install, delete, or update), for example, at least one (e.g., a function of turning on/off the external electronic device itself (or partial components) or a function of adjusting brightness (or resolution) of a display) of functions of the external electronic device (e.g., the first external electronic device 102 or the second external electronic device 105) which communicates with the electronic device, an application which operates in the external electronic device, or a service (e.g., a call service or a message service) provided from the external electronic device.

According to an embodiment, with reference to FIG. 14, the application 1470 may include an application (e.g., the health card application of a mobile medical device) which is preset according to attributes of the external electronic device (e.g., the first external electronic device 102 or the second external electronic device 105 shown in FIG. 1). According to an embodiment, the application 1470 may include an application received from the external electronic device (e.g., the server 106, the first external electronic device 102, or the second external electronic device 105 shown in FIG. 1). According to an embodiment, the application 1470 may include a preloaded application or a third party application which may be downloaded from a server. Names of the components of the program module 1410 according to various embodiments of the present disclosure may differ according to kinds of OSs.

According to various embodiments, with reference to FIG. 14, at least part of the program module 1410 may be implemented with software, firmware, hardware, or at least two or more combinations thereof. At least part of the program module 1410 may be implemented (e.g., executed) by, for example, a processor (e.g., a processor 120 shown in FIG. 1). At least part of the program module 1410 may include, for example, a module, a program, a routine, sets of instructions, or a process, and the like for performing one or more functions.

The terminology "module" used herein may mean, for example, a unit including one of hardware, software, and firmware or two or more combinations thereof. The terminology "module" may be interchangeably used with, for example, terminologies "unit", "logic", "logical block", "component", or "circuit", and the like. The "module" may be a minimum unit of an integrated component or a part thereof. The "module" may be a minimum unit performing one or more functions or a part thereof. The "module" may be mechanically or electronically implemented. For example, the "module" may include at least one of an application-specific integrated circuit (ASIC) chip, field-programmable gate arrays (FPGAs), or a programmable-logic device, which is well known or will be developed in the future, for performing certain operations.

According to various embodiments of the present disclosure, at least part of a device (e.g., modules or the functions) or a method (e.g., operations) may be implemented with, for example, instructions stored in computer-readable storage media which have a program module. When the instructions are executed by a processor, one or more processors may perform functions corresponding to the instructions. The computer-readable storage media may be, for example, a memory.

The computer-readable storage media may include a hard disc, a floppy disk, magnetic media (e.g., a magnetic tape), optical media (e.g., a compact disc read only memory (CD-ROM) and a digital versatile disc (DVD)), magneto-optical media (e.g., a floptical disk), a hardware device (e.g., a ROM, a random access memory (RAM), or a flash memory, and the like), and the like. Also, the program instructions may include not only mechanical codes compiled by a compiler but also high-level language codes which may be executed by a computer using an interpreter and the like. The above-mentioned hardware device may be configured to operate as one or more software modules to perform operations according to various embodiments of the present disclosure, and vice versa.

Modules or program modules according to various embodiments of the present disclosure may include at least one or more of the above-mentioned components, some of the above-mentioned components may be omitted, or other additional components may be further included. Operations executed by modules, program modules, or other components may be executed by a successive method, a parallel method, a repeated method, or a heuristic method. Also, some operations may be executed in a different order or may be omitted, and other operations may be added.

Embodiments of the present disclosure described and shown in the drawings are provided as examples to describe technical content and help understanding but do not limit the present disclosure. Accordingly, it should be interpreted that besides the embodiments listed herein, all modifications or modified forms derived based on the technical ideas of the present disclosure are included in the present disclosure as defined in the claims, and their equivalents.

The above-described embodiments of the present disclosure can be implemented in hardware, firmware or via the execution of software or computer code that can be stored in a recording medium such as a CD ROM, a DVD, a magnetic tape, a RAM, a floppy disk, a hard disk, or a magneto-optical disk or computer code downloaded over a network originally stored on a remote recording medium or a non-transitory machine readable medium and to be stored on a local recording medium, so that the methods described herein can be rendered via such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein.

The control unit may include a microprocessor or any suitable type of processing circuitry, such as one or more general-purpose processors (e.g., ARM-based processors), a digital signal processor (DSP), a programmable logic device (PLD), an application-specific integrated circuit (ASIC), a field-programmable gate array (FPGA), a graphical processing unit (GPU), a video card controller, etc. In addition, it would be recognized that when a general purpose computer accesses code for implementing the processing shown herein, the execution of the code transforms the general purpose computer into a special purpose computer for executing the processing shown herein. Any of the functions and steps provided in the Figures may be implemented in hardware, software or a combination of both and may be performed in whole or in part within the programmed instructions of a computer. No claim element herein is to be construed under the provisions of 35 U.S.C. 112, sixth paragraph, unless the element is expressly recited using the phrase "means for". In addition, an artisan understands and appreciates that a "processor" or "microprocessor" may be hardware in the claimed disclosure. Under the broadest reasonable interpretation, the appended claims are statutory subject matter in compliance with 35 U.S.C. § 101.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. An electronic device comprising:
    a memory configured to store at least one instruction, a sharable content, or an application related to the sharable content;
    at least one processor configured to execute the at least one instruction; and
    a display operatively connected to the at least one processor,
    wherein the at least one processor is configured to control to:
        display, on the display, a sharing object when an event corresponding to execution of the application or selection of the sharable content occurs, wherein the sharing object includes at least one sub object respectively corresponding to a plurality of external electronic devices and one common object,
        change a state of displaying of the sharing object when information on a connection to one of the plurality of external electronic devices changes, and
        display the sharing object from which a sub object corresponding to an external electronic device has been removed, in response to a disconnection of the corresponding external electronic device.

2. The electronic device of claim 1, wherein the at least one processor is further configured to control to output the sharing object comprising at least one sub object related to identification information of a currently connected external electronic device.

3. The electronic device of claim 1, wherein the at least one processor is further configured to control to display the sharing object comprising a sub object corresponding to a newly or additionally connected external electronic device.

4. The electronic device of claim 1, wherein the at least one processor is further configured to control to display a sub object selected by a specified input event such that the sub object indicates a content-transmission-disabled state.

5. The electronic device of claim 1, wherein the at least one processor is further configured to control to change at least one of a position, a size, a shape, a color, or a brightness of the sharing object according to at least one of a specified input event, types of connected external electronic devices, distances to the plurality of external electronic devices, or a history of content transmission to the plurality of external electronic devices.

6. The electronic device of claim 1, wherein the at least one processor is further configured to control to output a first virtual button related to an output of the sharing object or a second virtual button related to a removal of the sharing object.

7. The electronic device of claim 1, wherein the at least one processor is further configured to control to display, when the sharable content is transmitted, information corresponding to a transmission state in association with the sharing object.

8. A method for content sharing comprising:
receiving an event corresponding to an execution of a specified application related to sharable content or a selection of the sharable content;
outputting, to an execution screen of the specified application on a display, upon receiving the event, a sharing object configured to transmit the selected sharable content to all or at least one of a plurality of external electronic devices, wherein the sharing object includes at least one sub object respectively corresponding to the plurality of external electronic devices and one common object;
receiving information indicating a changed state of connection with one of the plurality of external electronic devices;
changing a state of displaying the sharing object in response to the information; and
displaying the sharing object from which a sub object corresponding to one of the plurality of external electronic devices has been removed, in response to a disconnection of the corresponding external electronic device.

9. The method of claim 8, wherein the outputting comprises:
outputting the sharing object comprising a sub object related to identification information of a currently connected external electronic device.

10. The method of claim 8, wherein the displaying comprises:
displaying the sharing object comprising a sub object corresponding to a newly or additionally connected external electronic device.

11. The method of claim 8, further comprising:
receiving a specified input event; and
displaying a sub object selected by the specified input event such that the sub object has a form corresponding to a content-transmission-disabled state.

12. The method of claim 8, wherein the outputting comprises:
differently displaying at least one of a position, a size, a shape, a color, or a brightness of the sharing object according to at least one of a specified input event, types of connected external electronic devices, distances to the plurality of external electronic devices, or a history of content transmission to the plurality of external electronic devices.

13. The method of claim 8, further comprising:
outputting a virtual button related to output of the sharing object or a virtual button related to a removal of the sharing object.

14. The method of claim 8, further comprising:
displaying, when the sharable content is transmitted, information corresponding to a transmission state in association with the sharing object.

* * * * *